(12) United States Patent
Li et al.

(10) Patent No.: US 11,963,098 B2
(45) Date of Patent: *Apr. 16, 2024

(54) MODEM CONTROL USING MIL DIMETER WAVE ENERGY MEASUREMENT

(71) Applicant: QUALCOMM Incorporated, San Diego, CA (US)

(72) Inventors: Junyi Li, Fairless Hills, PA (US); Navid Abedini, Basking Ridge, NJ (US); Ashwin Sampath, Skillman, NJ (US); Raju Hormis, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,841

(22) Filed: Apr. 1, 2022

(65) Prior Publication Data
US 2022/0295395 A1    Sep. 15, 2022

Related U.S. Application Data

(63) Continuation of application No. 16/943,980, filed on Jul. 30, 2020, now Pat. No. 11,297,567.
(Continued)

(51) Int. Cl.
| | | |
|---|---|---|
| *H04W 24/10* | (2009.01) | |
| *H04W 52/02* | (2009.01) | |
| *H04W 84/04* | (2009.01) | |

(52) U.S. Cl.
CPC ....... *H04W 52/0206* (2013.01); *H04W 24/10* (2013.01); *H04W 84/047* (2013.01)

(58) Field of Classification Search
CPC .......... H04W 52/0206; H04W 24/10; H04W 84/047
See application file for complete search history.

(56) References Cited

U.S. PATENT DOCUMENTS

| | | |
|---|---|---|
| 6,909,879 B1 | 6/2005 | Centore, III |
| 7,013,145 B1 | 3/2006 | Centore, III |
| | (Continued) | |

OTHER PUBLICATIONS

International Search Report and Written Opinion—PCT/US2020/044454—ISA/EPO—dated Nov. 3, 2020.

*Primary Examiner* — Hai V Nguyen
(74) *Attorney, Agent, or Firm* — Holland & Hart LLP/QUALCOMM Incorporated

(57) ABSTRACT

The described techniques relate to improved methods, systems, devices, and apparatuses that support modem control using millimeter wave (mmW) energy measurement. Generally, the described techniques provide for wireless device (e.g., wireless repeater) power savings in the absence of an attached (e.g., connected) user equipment (UE). For example, a wireless repeater may perform relay operations (e.g., amplification and forwarding operations) for communications between a base station and a UE in some channel (e.g., in a mmW channel). The wireless repeater may use energy measurements in the channel (e.g., analog mmW measurements) to control or configure a digital interface for monitoring out of band control information (e.g., in a sub-6 gigahertz (GHz) channel). For example, a wireless repeater may use energy measurements of signals transmitted by devices in a mmW band to configure (e.g., turn on) a digital interface of another modem to monitor for control information in a sub-6 GHz band.

88 Claims, 16 Drawing Sheets

Related U.S. Application Data

(60) Provisional application No. 62/881,892, filed on Aug. 1, 2019.

(56) References Cited

U.S. PATENT DOCUMENTS

| | | |
|---|---|---|
| 7,769,347 B2 | 8/2010 | Louberg et al. |
| 7,881,755 B1 | 2/2011 | Mishra et al. |
| 7,912,506 B2 | 3/2011 | Lovberg et al. |
| 9,391,688 B2 | 7/2016 | Artemenko et al. |
| 9,711,998 B2 | 7/2017 | Nakano et al. |
| 10,051,488 B1 | 8/2018 | Vannucci et al. |
| 10,069,347 B2 | 9/2018 | Nakano et al. |
| 10,244,408 B1 | 3/2019 | Vannucci et al. |
| 10,447,375 B1 | 10/2019 | Padhy et al. |
| 10,455,488 B1 | 10/2019 | Bendlin et al. |
| 10,547,372 B2 | 1/2020 | Rappaport et al. |
| 10,834,667 B2 | 11/2020 | Bendlin et al. |
| 10,903,689 B2 | 1/2021 | Nakano et al. |
| 11,297,567 B2 * | 4/2022 | Li .................... H04W 52/0225 |
| 11,463,156 B2 * | 10/2022 | Abedini ................ H04W 24/10 |
| 11,653,312 B1 * | 5/2023 | Abotabl ........... H04W 56/0095 455/522 |
| 11,690,120 B2 * | 6/2023 | Yang ................ H04W 72/0453 370/329 |
| 2006/0111047 A1 | 5/2006 | Louberg et al. |
| 2006/0264210 A1 | 11/2006 | Lovberg et al. |
| 2007/0135056 A1 | 6/2007 | Kremer et al. |
| 2008/0002652 A1 | 1/2008 | Gupta et al. |
| 2014/0227966 A1 | 8/2014 | Artemenko et al. |
| 2014/0355991 A1 * | 12/2014 | Cameirao .......... H04B 10/2575 398/79 |
| 2016/0029403 A1 | 1/2016 | Roy et al. |
| 2016/0049831 A1 | 2/2016 | Nakano et al. |
| 2016/0050012 A1 | 2/2016 | Frolov et al. |
| 2016/0134356 A1 | 5/2016 | Rappaport et al. |
| 2017/0222487 A1 | 8/2017 | Nakano et al. |
| 2018/0249461 A1 | 8/2018 | Miao et al. |
| 2018/0310283 A1 | 10/2018 | Deenoo et al. |
| 2018/0323850 A1 | 11/2018 | Baligh et al. |
| 2018/0375381 A1 | 12/2018 | Nakano et al. |
| 2019/0081688 A1 | 3/2019 | Deenoo et al. |
| 2019/0104514 A1 | 4/2019 | Chendamarai Kannan et al. |
| 2019/0123442 A1 | 4/2019 | Vannucci et al. |
| 2019/0123992 A1 | 4/2019 | Ly et al. |
| 2019/0229850 A1 | 7/2019 | Hui et al. |
| 2019/0335504 A1 | 10/2019 | Chakraborty et al. |
| 2019/0349834 A1 | 11/2019 | Teyeb et al. |
| 2019/0369158 A1 | 12/2019 | Murao |
| 2019/0372653 A1 | 12/2019 | Chae et al. |
| 2020/0084618 A1 | 3/2020 | Teyeb et al. |
| 2020/0084688 A1 | 3/2020 | Mildh et al. |
| 2020/0120725 A1 | 4/2020 | Mildh et al. |
| 2020/0162135 A1 | 5/2020 | Sun et al. |
| 2020/0166623 A1 | 5/2020 | Sahin et al. |
| 2020/0195310 A1 | 6/2020 | Abedini et al. |
| 2020/0267633 A1 | 8/2020 | Bendlin et al. |
| 2020/0280127 A1 * | 9/2020 | Hormis ................ H04B 7/155 |
| 2020/0280355 A1 | 9/2020 | Abedini et al. |
| 2020/0280365 A1 | 9/2020 | Abedini et al. |
| 2020/0280887 A1 | 9/2020 | Abedini et al. |
| 2020/0314601 A1 * | 10/2020 | Hormis ................ H04B 7/155 |
| 2020/0322037 A1 * | 10/2020 | Abedini ................ H04W 24/10 |
| 2020/0366406 A1 | 11/2020 | Kim et al. |
| 2021/0007142 A1 | 1/2021 | Bendlin et al. |
| 2021/0029740 A1 | 1/2021 | Yerramalli et al. |
| 2021/0037457 A1 * | 2/2021 | Li ..................... H04W 52/0203 |
| 2021/0037459 A1 * | 2/2021 | Li ........................ H04B 17/327 |
| 2021/0037460 A1 * | 2/2021 | Li ..................... H04W 52/0206 |
| 2021/0037574 A1 | 2/2021 | Li et al. |
| 2021/0067182 A1 | 3/2021 | Ravi et al. |
| 2021/0103028 A1 | 4/2021 | Zhang et al. |

\* cited by examiner

MODEM CONTROL USING MIL DIMETER WAVE ENERGY MEASUREMENT

CROSS REFERENCE

The present application for patent is a Continuation of U.S. patent application Ser. No. 16/943,980 by LI et al., entitled "MODEM CONTROL USING MILLIMETER WAVE ENERGY MEASUREMENT" filed Jul. 30, 2020, which claims the benefit of U.S. Provisional Patent Application No. 62/881,892 by LI et al., entitled "MODEM CONTROL USING MILLIMETER WAVE ENERGY MEASUREMENT," filed Aug. 1, 2019, assigned to the assignee hereof, and expressly incorporated by reference herein.

INTRODUCTION

The following relates to wireless communications, and more specifically to wireless device modem control.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication at a wireless device is described. The method may include measuring an energy level in a first channel during one or more configured slots. The method may also include determining that the measured energy level satisfies a threshold. The method may include powering on a digital interface based on the determining that the measured energy level satisfies the threshold. Additionally, the method may include monitoring a second channel, using the digital interface, for control information.

An apparatus for wireless communication at a wireless device is described. The apparatus may include a processor and memory coupled with the processor. The processor and memory may be configured to measure an energy level in a first channel during one or more configured slots. The processor and memory may also be configured to determine that the measured energy level satisfies a threshold. The processor and memory may also be configured to power on a digital interface based on the determining that the measured energy level satisfies the threshold. Additionally, the processor and memory may be configured to monitor a second channel, using the digital interface, for control information.

Another apparatus for wireless communication at a wireless device is described. The apparatus may include means for measuring an energy level in a first channel during one or more configured slots. The apparatus may also include means for determining that the measured energy level satisfies a threshold. The apparatus may also include means for powering on a digital interface based on the determining that the measured energy level satisfies the threshold. Additionally, the apparatus may include means for monitoring a second channel, using the digital interface, for control information.

A non-transitory computer-readable medium storing code for wireless communication at a wireless device is described. The code may include instructions executable by a processor to measure an energy level in a first channel during one or more configured slots. The code may also include instructions executable by a processor to determine the that the measured energy level satisfies a threshold. The code may also include instructions executable by a processor to power on a digital interface based on the determining that the measured energy level satisfies the threshold. Additionally, the code may include instructions executable by a processor to monitor a second channel, using the digital interface, for control information.

In some examples of the method, apparatuses, and non-transitory computer-readable medium described herein, measuring the energy level in the first channel during the one or more configured slots may include operations, features, means, or instructions for measuring the energy level in a millimeter wave channel, using an analog interface, during one or more random access channel slots. In some examples of the method, apparatuses, and non-transitory computer-readable medium described herein, monitoring the second channel, using the digital interface, for control information may include operations, features, means, or instructions for monitoring a sub-6 gigahertz channel, using the digital interface, for control information from a base station.

Some examples of the method, apparatuses, and non-transitory computer-readable medium described herein may further include operations, features, means, or instructions for receiving, from a base station, signaling that indicates the threshold. Some examples of the method, apparatuses, and non-transitory computer-readable medium described herein may further include operations, features, means, or instructions for receiving, from a base station, configuration information indicative of the one or more configured slots, one or more beamforming parameters, an uplink or downlink direction to be used for the measuring of the energy level, the threshold, or some combination thereof. In some examples of the method, apparatuses, and non-transitory computer-readable medium described herein, the configuration information indicative of the threshold includes an absolute value of the energy level or a relative value of the energy level compared to energy detected in resources other than the one or more configured slots.

Some examples of the method, apparatuses, and non-transitory computer-readable medium described herein may further include operations, features, means, or instructions for setting a digital interface timer based on the determining that the measured energy level satisfies the threshold. Some examples of the method, apparatuses, and non-transitory computer-readable medium described herein may further include operations, features, means, or instructions for powering off the digital interface based on expiration of the digital interface timer.

Some examples of the method, apparatuses, and non-transitory computer-readable medium described herein may further include operations, features, means, or instructions for receiving, from a base station, control information prior to expiration of the digital interface timer based on the monitoring of the second channel, where the control information includes one or more commands for the digital interface, and configuring the digital interface based on the one or more commands.

In some examples of the method, apparatuses, and non-transitory computer-readable medium described herein, configuring the digital interface may include operations, features, means, or instructions for powering on the digital interface, powering off the digital interface, configuring a monitoring periodicity of the digital interface, configuring one or more resources to be monitored by the digital interface, or some combination thereof, based on the one or more commands.

Some examples of the method, apparatuses, and non-transitory computer-readable medium described herein may further include operations, features, means, or instructions for transmitting, using the digital interface, an indication of a monitoring state of the digital interface to a base station, where the monitoring state of the digital interface may be based on the powering of the digital interface. Some examples of the method, apparatuses, and non-transitory computer-readable medium described herein may further include operations, features, means, or instructions for receiving, from a base station, control information based on the monitoring of the second channel, where the control information includes one or more commands for the digital interface, and configuring the digital interface based on the one or more commands.

In some examples of the method, apparatuses, and non-transitory computer-readable medium described herein, configuring the digital interface may include operations, features, means, or instructions for powering on the digital interface, powering off the digital interface, configuring a monitoring periodicity of the digital interface, configuring one or more resources to be monitored by the digital interface, or some combination thereof, based on the one or more commands.

Some examples of the method, apparatuses, and non-transitory computer-readable medium described herein may further include operations, features, means, or instructions for monitoring the second channel, using the digital interface, for control information according to a first monitoring periodicity, and transitioning from monitoring the second channel according to the first monitoring periodicity to monitoring the second channel according to a second monitoring periodicity based on the determining that the measured energy level satisfies the threshold, where the second monitoring periodicity may be associated with a shorter monitoring interval than the first monitoring periodicity.

In some examples of the method, apparatuses, and non-transitory computer-readable medium described herein, the wireless device includes a wireless repeater. In some examples of the method, apparatuses, and non-transitory computer-readable medium described herein, the wireless device may be configured to measure the energy level in a first bandwidth of the first channel and monitor the control information in a second bandwidth of the second channel. In some examples of the method, apparatuses, and non-transitory computer-readable medium described herein, the second bandwidth may be less than the first bandwidth.

Some examples of the method, apparatuses, and non-transitory computer-readable medium described herein may further include operations, features, means, or instructions for receiving out of band control information based on the monitoring of the second channel, and performing an amplification and forward operation in the first channel for a radio frequency analog signal based on the out of band control information. In some examples of the method, apparatuses, and non-transitory computer-readable medium described herein, the out of band control information indicates a receive beam direction for a radio frequency analog signal, a receive time interval for the radio frequency analog signal, a transmit beam direction for the radio frequency analog signal, a transmit time interval for the radio frequency analog signal, or some combination thereof.

A method of wireless communication at a base station is described. The method may include receiving, from a wireless device in a second channel, an indication of a monitoring state of a digital interface of the wireless device. In some cases, the monitoring state of the digital interface is based on a powering of the digital interface, a monitoring periodicity of the digital interface, or both. Additionally, the method may include transmitting, to the wireless device in the second channel, control information based on the indication of the monitoring state of the digital interface of the wireless device. In some cases, the control information is associated with a radio frequency analog signal in a first channel.

An apparatus for wireless communication at a base station is described. The apparatus may include a processor and memory coupled with the processor. The processor and memory may be configured receive, from a wireless device in a second channel, an indication of a monitoring state of a digital interface of the wireless device. In some cases, the monitoring state of the digital interface is based on a powering of the digital interface, a monitoring periodicity of the digital interface, or both. Additionally, the processor and memory may be configured to transmit, to the wireless device in the second channel, control information based on the indication of the monitoring state of the digital interface of the wireless device. In some cases, the control information is associated with a radio frequency analog signal in a first channel.

Another apparatus for wireless communication at a base station is described. The apparatus may include means for receiving, from a wireless device in a second channel, an indication of a monitoring state of a digital interface of the wireless device. In some cases, the monitoring state of the digital interface is based on a powering of the digital interface, a monitoring periodicity of the digital interface, or both. Additionally, the apparatus may include means for transmitting, to the wireless device in the second channel, control information based on the indication of the monitoring state of the digital interface of the wireless device. In some cases, the control information is associated with a radio frequency analog signal in a first channel.

A non-transitory computer-readable medium storing code for wireless communication at a base station is described. The code may include instructions executable by a processor to receive, from a wireless device in a second channel, an indication of a monitoring state of a digital interface of the wireless device. In some cases, the monitoring state of the digital interface is based on a powering of the digital interface, a monitoring periodicity of the digital interface, or both. Additionally, the code may include instructions executable by the processor to transmit, to the wireless device in the second channel, control information based on the indication of the monitoring state of the digital interface of the wireless device. In some cases, the control information is associated with a radio frequency analog signal in a first channel.

Some examples of the method, apparatuses, and non-transitory computer-readable medium described herein may further include operations, features, means, or instructions for transmitting, to the wireless device, configuration information indicative of one or more configured slots, one or more beamforming parameters, an uplink or downlink direction, a threshold, or some combination thereof, for wireless repeater measurement of an energy level in the first channel. In some examples of the method, apparatuses, and non-transitory computer-readable medium described herein, the configuration information indicative of the threshold includes an absolute value of the energy level or a relative value of the energy level compared to energy detected in resources other than the one or more configured slots.

In some examples of the method, apparatuses, and non-transitory computer-readable medium described herein, the control information includes one or more commands for the digital interface of the wireless device. In some examples of the method, apparatuses, and non-transitory computer-readable medium described herein, the one or more commands may be indicative of powering on the digital interface of the wireless device, powering off the digital interface of the wireless device, a monitoring periodicity of the digital interface of the wireless device, one or more resources to be monitored by the digital interface of the wireless device, or some combination thereof.

In some examples of the method, apparatuses, and non-transitory computer-readable medium described herein, the control information indicates a receive beam direction for a radio frequency analog signal, a receive time interval for the radio frequency analog signal, a transmit beam direction for the radio frequency analog signal, a transmit time interval for the radio frequency analog signal, or some combination thereof.

Some examples of the method, apparatuses, and non-transitory computer-readable medium described herein may further include operations, features, means, or instructions for receiving an amplified and forwarded radio frequency analog signal from the wireless device based on the control information. In some examples of the method, apparatuses, and non-transitory computer-readable medium described herein, the first channel includes a millimeter wave channel and the second channel includes a sub-6 gigahertz channel.

DETAILED DESCRIPTION

Figure 1:
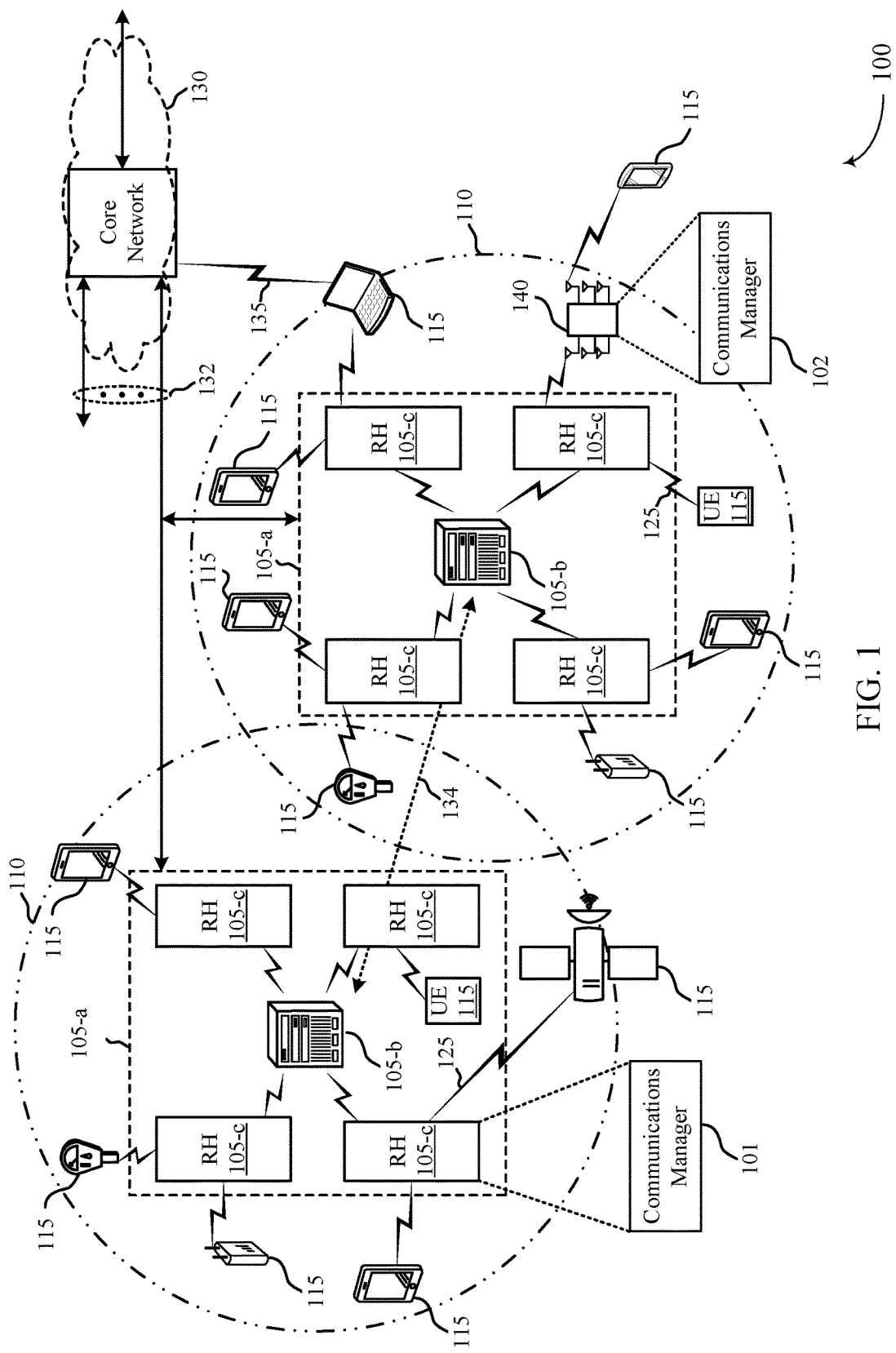
FIG. 1 illustrates an example of a system for wireless communications that supports modem control using millimeter (mmW) energy measurement in accordance with one or more aspects of the present disclosure.

In some wireless communications systems, a base station may communicate with a UE over a wireless link. For instance, in a wireless telecommunications system, base stations and UEs may operate in millimeter wave (mmW) frequency ranges, e.g., 28 gigahertz (GHz), 40 GHz, 60 GHz, etc. That is, the electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "Sub-6 GHz" band in various documents and articles. A similar nomenclature issue sometimes occurs with regard to FR2, which is often referred to (interchangeably) as a "millimeter wave" or band in documents and articles, despite being different from the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Wireless communications at these frequencies may be associated with increased signal attenuation (e.g., pathloss), which may be influenced by various factors, such as temperature, barometric pressure, diffraction, blockage, etc. As a result, signal processing techniques, such as beamforming, may be used to coherently combine energy and overcome the pathlosses at these frequencies. However, the transmission of a signal (such as a beamformed signal) between the base station and the UE may not be possible or may be interfered with due to a physical barrier or a radio frequency (RF) jammer. In these cases, a repeating device (e.g., a wireless repeater, a smart repeater, a mmW repeater, a wireless relay device, or the like) may be used to repeat and/or relay the transmission from the base station to the UE, and vice versa, thereby enabling efficient communication in the presence of physical barriers, RF jammers, etc. In some examples, a repeating device such as a smart repeater may capable of advanced operation features as described herein.

A wireless repeater may repeat, extend, or redirect wireless signals received from a base station to a UE, from the UE to the base station, or between other wireless devices. For example, the repeater may receive a signal from a base station and retransmit the signal to a UE, or receive a signal from a UE and retransmit the signal to the base station. In some examples, a wireless repeater may amplify and forward (e.g., amplify and transmit) signals transmitted between wireless devices. In cases where transmissions from the base station to the UE (and vice versa) are blocked due to physical barriers or are associated with path loss influenced by various factors (e.g., such as distance between the base station and UE, temperature, barometric pressure, diffraction, blockage, etc.), a wireless repeater may receive signals transmitted between wireless devices, amplify the received signals, and forward (e.g., transmit) the amplified signals to facilitate efficient communications between the wireless devices.

Additionally, in some cases, various phase rotations may be applied to signals transmitted between wireless devices, where, for example, a base station may transmit a signal on a first carrier frequency and with a phase rotation (e.g., a pre-rotation). In cases where transmissions from the base station to the UE (and vice versa) are blocked due to an RF jammer, the RF jammer may corrupt certain frequencies, and those frequencies (such as the frequency used for transmission by the base station) may therefore not be reliable for transmission. As such, a wireless repeater may be used to transmit (or retransmit) the signal after amplifying the signal, performing a frequency translation (e.g., heterodyning) of a first carrier frequency to a second carrier frequency, etc. For example, the second carrier frequency may be different from the frequency that was used to transmit the signal to the repeater, and may be unaffected by interference from the RF jammer.

The wireless repeater may be configured to perform relay operations (e.g., wireless repeater operations, such as signal amplification, signal phase rotation, signal forwarding, etc.) to reduce or minimize path loss or interference in various environments. In some cases, the repeater may be configured via base station control signaling. For example, a base station may control parameters of wireless repeater forwarding such as amplification, direction, frequency gains, frequency translation, etc. As such, a wireless repeater may monitor a control channel (e.g., a physical downlink control channel (PDCCH)) for control information from the base station in order to configure and perform relay (e.g., amplification and forwarding) duties.

However, in some cases, diligent monitoring for control information (e.g., monitoring of every slot of a control channel) may be associated with high power consumption at the wireless repeater. In cases where a UE is not attached to the wireless repeater or base station, such monitoring for control information may be inefficient, as relay duties may be less likely to be configured or may be less frequently configured in such cases. Further, it may be efficient for some wireless repeaters to monitor for out of band control information using an out of band control interface (e.g., a sub-6 GHz narrowband internet of things (NB-IoT) modem). Out of band control information may refer to control information received in a different band or frequency channel than the band or frequency channel the wireless repeater is configured for relay operations in. For example, a wireless repeater may perform relay operations for mmW communications between a base station and a UE, and the wireless repeater may monitor for out of band control information (e.g., in some sub-6 GHz channel). In such an example, the wireless repeater may continuously or frequently power the control interface (e.g., the sub-6 GHz NB-IoT modem) to monitor for out of band control information, which may result in unnecessary power consumption in cases where a UE is not attached to the base station or wireless repeater (e.g., in cases where wireless repeater relay duties for mmW communications may be less frequent or nonexistent).

The described techniques relate to improved methods, systems, devices, and apparatuses that support modem control using mmW energy measurement. Generally, the described techniques provide for efficient monitoring for out of band control information based on measured energy levels (e.g., in mmW spectrum). For example, a wireless repeater (e.g., a wireless relay, a smart repeater, a mmW repeater, etc.) may operate in a power saving mode and may monitor for out of band control information from a base station according to a slow state (e.g., a sub-6 GHz modem may monitor for control information according to a long, or less frequent, monitoring periodicity relative to a monitoring periodicity associated with a fast state). Upon detection of possible UE attachment to the base station (e.g., upon detection of a random access channel (RACH) message in a mmW channel), the wireless repeater may transition to monitoring for out of band control information from the base station according to a fast state (e.g., according to a short, or more frequent, monitoring periodicity relative to a monitoring periodicity associated with a slow state).

For example, a wireless repeater may use analog mmW measurements to control a digital interface (e.g., a sub-6 GHz NB-IoT modem) used for monitoring an out of band control channel. If the wireless repeater detects energy in a mmW channel (e.g., in one or more preconfigured slots, such as one or more RACH slots), the wireless repeater may transition a sub-6 GHz digital control interface to an active state (e.g., a fast state) to monitor for control information from the base station (e.g., where the control information may further configure operation of the sub-6 GHz digital control interface, configure relay operations in the mmW channel, etc.). Generally, transitioning of an out of band digital control interface to an active state may refer to powering (e.g., turning on) the out of band digital control interface, more frequently monitoring a control channel using the out of band digital control interface, etc. As such, prior to mmW energy detection, operation of the out of band digital control interface in a slow state may refer to operation with a powered off out of band digital control interface, operation with the out of band digital control interface in a low power state, operation with less frequent monitoring of the control channel using the out of band digital control interface, etc.

As discussed herein, a base station may transmit control commands (e.g., fast commands configuring more frequent control channel monitoring by the wireless repeater, slow commands configuring less frequent control channel monitoring by the wireless repeater, etc.) via the out of band control channel to modify the monitoring configuration of the wireless repeater. For example, upon detection of possible UE attachment (e.g., upon a mmW energy measurement that exceeds a configured threshold), a wireless repeater may transition an out of band digital control interface to a tentative fast state, and may monitor a control channel (e.g., a sub-6 GHz control channel) according to the tentative fast state for additional control commands from the base station. If no control commands are received from the base station (e.g., prior to expiration of a timer maintained by the wireless repeater), the wireless repeater may transition the out of band digital control interface back to a slow state (e.g., and monitor the control channel less frequently, or not at all, according to the slow state).

Aspects of the disclosure are initially described in the context of a wireless communications system. Process flows for implementation of aspects of the discussed techniques are then described. Aspects of the disclosure are further illustrated by and described with reference to apparatus diagrams, system diagrams, and flowcharts that relate to modem control using mmW energy measurement.

FIG. 1 illustrates an example of a wireless communications system 100 that supports modem control using mmW energy measurement in accordance with one or more aspects of the present disclosure. The wireless communications system 100 includes network devices 105, UEs 115, and a core network 130. In some examples, the wireless communications system 100 may be a LTE network, a LTE-A network, a LTE-A Pro network, or a NR network. In some cases, wireless communications system 100 may support enhanced broadband communications, ultra-reliable (e.g., mission critical) communications, low latency communications, or communications with low-cost and low-complexity devices. Wireless communications system 100 may support signaling between network devices 105, repeaters 140, and UEs 115 for configuration and management of repeater 140 control channel monitoring.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (e.g., S1, S2) and may perform radio configuration and scheduling for communication with the UEs 115. In various examples, the network devices 105-b may communicate, either directly or indirectly (e.g., through core network 130), with each other over backhaul links 134 (e.g., X1, X2), which may be wired or wireless communication links.

Each network device 105-b may also additionally or alternatively communicate with a number of UEs 115 through a number of other network devices 105-c, where network device 105-c may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

Network devices 105 may wirelessly communicate with UEs 115 via one or more base station antennas. Network device 105 described herein may include or may be referred to by those skilled in the art as a base transceiver station, a radio base station, an access point, a radio transceiver, a NodeB, an eNB, a next-generation Node B or giga-nodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like. In some examples, a network device 105 may wirelessly communicate with one or more repeaters 140 (e.g., repeating devices, wireless repeaters) that may support the retransmission, amplification, frequency translation, etc. of signaling to one or more other devices, such as a UE 115. Similarly, a repeater 140 may be used to retransmit or forward signaling from a UE 115 to a network device 105.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, a repeater 140 may be a MTC or IoT device that is controlled by a network device 105 or UE 115 via a low bandwidth (low-band) or NB-IoT connection and performs repeating of received signals without demodulation or decoding of such signals based on control information provided by the low-band or NB-IoT connection.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or other interface). Network devices 105 may communicate with one another over backhaul links 134 (e.g., via an X2, Xn, or other interface) either directly (e.g., directly between network devices 105) or indirectly (e.g., via core network 130).

At least some of the network devices, such as a network device 105, may include subcomponents such as an access network entity, which may be an example of an ANC. Each access network entity may communicate with UEs 115 through a number of other access network transmission entities, which may be referred to as a radio head, a smart radio head, or a transmission/reception point (TRP). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, for example, in the range of 300 MHz to 300 GHz. The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high EHF region of the spectrum (e.g., from 30 GHz to 300 GHz), also known as the millimeter band. In some examples, wireless communications system 100 may support mmW communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g. synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to determine or identify (e.g., by the network device 105 or a receiving device, such as a UE 115) a beam direction for subsequent transmission and/or reception by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a network device 105 or core network 130 supporting radio bearers for user plane data. At the Physical (PHY) layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related.

The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a network device 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a network device 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within a synchronization signal block (SSB) on respective directional beams, where one or more SSBs may be included within a synchronization signal burst.

Wireless communications system 100 may include one or more repeaters 140 (e.g., wireless repeaters 140). Wireless repeaters 140 may include functionality to repeat, extend, and redirect wireless signals transmitted within a wireless communications system. In some cases, wireless repeaters 140 may be used in line-of-sight (LOS) or non-line of sight (NLOS) scenarios. In a LOS scenario, directional (e.g., beamformed) transmissions, such as mmW transmissions, may be limited by path-loss through air. In a NLOS scenario, such as in an urban area or indoors, mmW transmissions may be limited by signal blocking or signal interfering physical objects. In either scenario, a wireless repeater 140 may be used to receive a signal from a network device 105 (e.g., a base station) and transmit a signal to UE 115, or receive a signal from a UE 115 and transmit the signal to the network device 105. Beamforming, filtering, gain control, and phase correction techniques may be utilized by the wireless repeater 140 to improve signal quality and avoid radio frequency interference with the transmitted signal. Phase rotation adjustment may be applied by the wireless repeater 140 to the signal to correct for phase rotation error caused by the frequency translation by the repeater 140.

In some cases, a wireless repeater 140 may include an array of reception antennas and an array of transmission antennas. In some cases, the wireless repeater 140 may include digital filtering, and the wireless repeater 140 may include a signal processing chain connected (e.g., coupled, linked, attached) between the array of reception of antennas and the array of transmission antennas. The signal processing chain may be implemented as an radio frequency integrated circuit (RFIC), which may include radio frequency/microwave components such as one or more phase shifters, low noise amplifiers (LNAs), power amplifiers (PAs), PA drivers, heterodyning mixers, carrier tracking circuits, gain controllers, power detectors, filters, or other circuitry, in conjunction with a digital component that may include one or more of digital filters, processors, analog-to-digital (A/D) converters, digital-to-analog (D/A) converters, or other circuitry. The phase shifters may be controlled by one or more beam controllers for beamforming to reduce signal interference. The heterodyning mixers may downconvert a frequency of a received signal to an intermediate frequency (IF) or baseband frequency, that may be filtered by the one or more filters, and the heterodyning mixers may upconvert the filtered signal back to the higher frequency. The signal processing chain may include a feedback path for monitoring the output of one or more PAs, and adjusting gains to one or more PA drivers to the PAs and gains to one or more LNAs based on the output. The gain adjustment may function to stabilize the signal reception and transmission and improve signal quality between devices such as network device 105 and UE 115. Accordingly, through beamforming, filtering, and gain control, signal quality (e.g., mmW signals) may be improved in LOS and NLOS scenarios.

As described, the wireless repeater 140 may include components (e.g., antenna arrays and signal processing chain circuitry) in the analog/radio frequency domain, as well as one or more digital filters, or both analog and digital filters. Further, in some cases the wireless repeater 140 may include digital circuitry for receiving control information (e.g., for receiving remote configuration of gain, direction, and local oscillator tracking via sub-6 or via mmW signals). In some cases where the control information is not received via the mmW signals, the control information may be received using a different radio access technology than used between the network device 105 and UE 115. For example, one or more side channels may be used to provide control information and implemented as Bluetooth, ultra-wide band, wireless LAN, etc. protocols, and as such, the repeater 140 may include circuitry and/or processors for receiving and processing signals received via those protocols and controlling beamforming at the radio frequency components based on those signals received at the side channel. In some cases, control information may be received via a sub-6 GHz NB-IoT channel.

As discussed herein, a wireless repeater may perform relay operations (e.g., amplification and forwarding operations) for communications between a base station and a UE in some channel (e.g., in a mmW channel). The wireless repeater may use energy measurements in the channel (e.g., analog mmW measurements) to control or configure a digital interface for monitoring out of band control information (e.g., in a sub-6 GHz channel). That is, a wireless repeater may use energy measurements of signals transmitted by a base station 105 and/or a UE 115 (e.g., in mmW band) to configure (e.g., turn on) a digital interface of another modem (e.g., in a sub-6 GHz band).

In some aspects, a repeater 140 may refer to a mmW repeater 140 and may receive an analog mmW signal from a network device 105, may amplify the analog mmW signal, and may transmit the amplified mmW signal to one or more UEs 115. In some aspects, the mmW repeater 140 may be an analog mmW repeater, sometimes also referred to as a layer-1 mmW repeater. Additionally, or alternatively, the repeater 140 may be a wireless transmit receive point (TRP) acting as a distributed unit (e.g., of a 5G access node) that communicates wirelessly with a network device 105 acting as a central unit or an access node controller (e.g., of the 5G access node). In some examples, the repeater 140 may receive, amplify, and transmit the analog mmW signal without performing analog-to-digital conversion of the analog mmW signal and/or without performing any digital signal processing on the mmW signal. In this way, latency may be reduced and a cost to produce the repeater 140 may be reduced. Additional details regarding repeater 140 are provided elsewhere herein.

One or more of the network devices 105 may include a communications manager 101, which may receive, from a wireless repeater 140 in a first channel (e.g., a mmW channel), an indication of a radio frequency analog signal. The communications manager 101 may receive, from the wireless repeater 140 in a second channel (e.g., a sub-6 GHz channel), an indication of a monitoring state of a digital interface of the wireless repeater 140, where the monitoring state of the digital interface is based on a powering of the digital interface, a monitoring periodicity of the digital interface, or both. The communications manager 101 may transmit, to the wireless repeater 140 in the second channel, control information based on the indication of the monitoring state of the digital interface of the wireless repeater 140.

Figure 2:
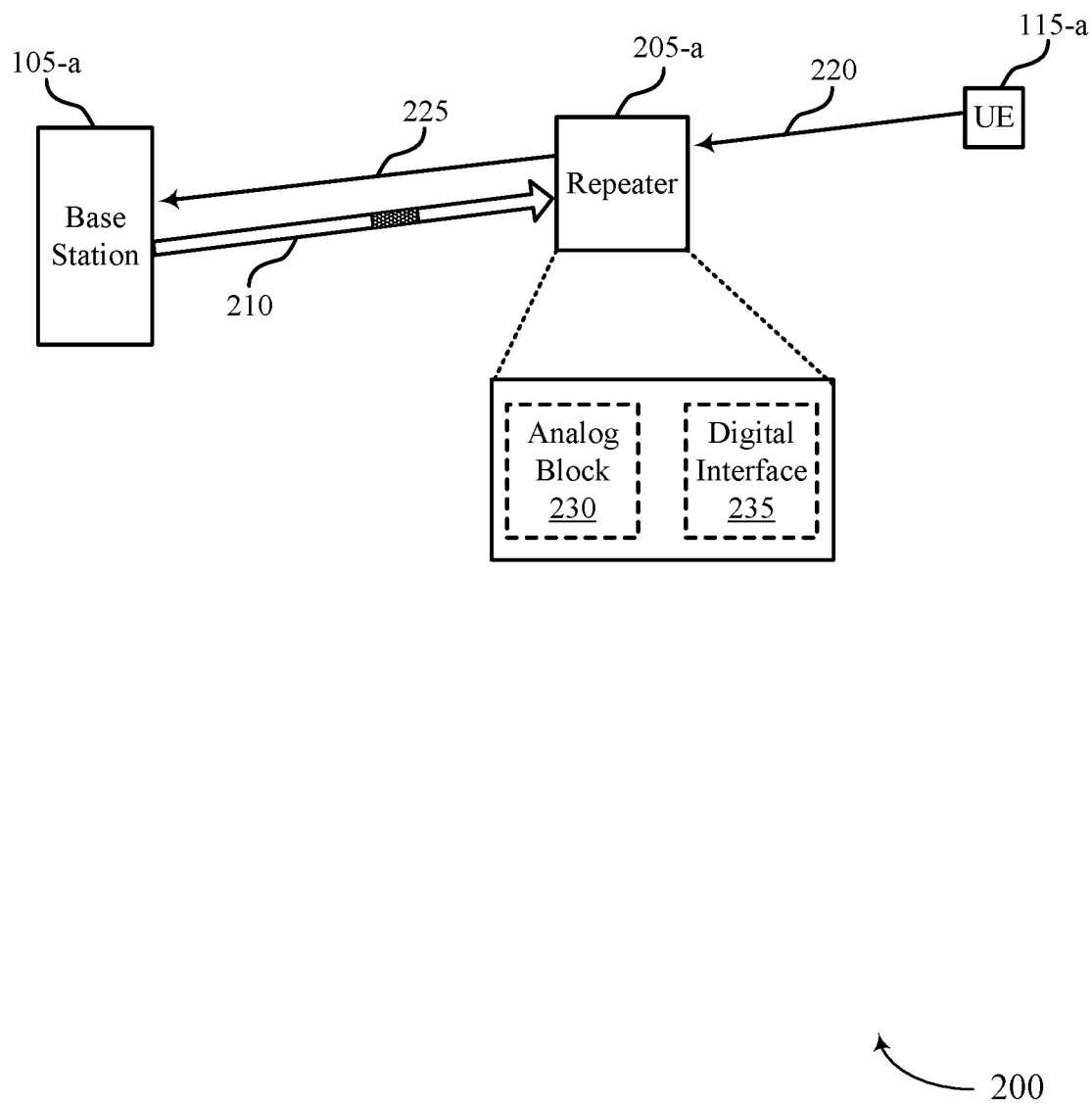
FIG. 2 illustrates an example of a wireless communications system that supports modem control using mmW energy measurement in accordance with one or more aspects of the present disclosure.

Repeaters 140 may include a communications manager 102, which may measure an energy level in a first channel (e.g., in a mmW channel) during one or more configured slots (e.g., in one or more RACH slots). In some cases, the communications manager 102 may determine that the measured energy level satisfies a threshold. For example, the communications manager 102 may determine the measured energy level is greater than a threshold and power on a digital interface (e.g., a sub-6 GHz NB-IoT modem) based on the determination that the measured energy level is greater than the threshold. The communications manager 102 may then monitor a second channel (e.g., a sub-6 GHz channel), using the digital interface, for control information FIG. 2 illustrates an example of a wireless communications system 200 that supports modem control using mmW energy measurement in accordance with aspects of the present disclosure. In some examples, wireless communications system 200 may implement aspects of wireless communications system 100. For instance, wireless communications system 200 may include a base station 105-a and a UE 115-a, which may be examples of a network device 105 and UE 115 as described with reference to FIG. 1. Base station 105-a may communicate with one or more UEs 115. In some cases, communications may be relayed from base station 105-a to UEs 115 (and vice versa) by one or more repeaters 205 (e.g., wireless repeaters), such as repeater 205-a which may be an example of a repeater 140 described with reference to FIG. 1.

In the example of FIG. 2, repeater 205-a may monitor an out of band control channel 210 (e.g., an out of band downlink control channel) for control information 215 sent by base station 105-a. Further, repeater 205-a may monitor configured slots (e.g., RACH slots) for signals 220 that may be sent by one or more UEs 115 (e.g., UE 115-a), and repeater 205-a may transmit forwarded signals 225 to base station 105-a. Repeater 205-a may be configured to forward a signal 220. As discussed in more detail herein, a repeater configuration may include information or parameters for configuring forwarding operations performed by the repeater 205-a. In the present example, repeater 205-a may be configured to forward an uplink signal 220 from UE 115-a to base station 105-a (e.g., such that repeater 205-a transmits a forwarded signal 225 to base station 105-a). Aspects of the techniques described herein are also applicable to downlink forwarding operations performed by repeater 205-a by analogy, without departing from the scope of the present disclosure. For example, repeater 205-a may perform energy measurement and digital interface configuration techniques described herein based on uplink signals or downlink signals, depending on the configuration of the repeater 205-a).

As discussed herein, repeaters 205 may relay signals between a base station 105 and UEs 115 to avoid or reduce blockage or interference. For example, in some cases, there may be an object blocking a signal being transmitted from the base station 105-a to the UE 115-a, or vice versa. The object may be a physical object or, in some cases, may be a frequency-based jammer, such as an RF jammer. Physical objects that may block transmitted signals may include hills, mountains, buildings, walls, other infrastructure, etc. An RF jammer may function by targeting, interfering with, blocking, or jamming, certain frequencies that transmissions are sent on. As an example, an RF jammer may include another wireless device (e.g., other base stations 105, UEs 115, etc.), other types of transmissions or signals (e.g., radar, satellite, etc.), or the like. RF jammers may include radio frequency jammers that affect transmissions through adjacent channel selectivity (ACS) jamming, in-band blocking (IBB), and out-of-band (OOB) jamming.

In the example of FIG. 2, repeater 205-a may repeat, extend, or redirect wireless signals received from base station 105-a to UE 115-a, from UE 115-a to base station 105-a, or between other wireless devices. For example, the repeater 205-a may receive a signal from base station 105-a and retransmit the signal to a UE 115-a, or receive a signal from UE 115-a and retransmit the signal to base station 105-a. In some examples, repeater 205-a may amplify and forward (e.g., amplify and transmit) signals transmitted between base station 105-a and UE 115-a. In cases where transmissions from base station 105-a to UE 115-a (and vice versa) are blocked due to physical barriers or are associated with path loss influenced by various factors (e.g., such as distance between the base station and UE, temperature, barometric pressure, diffraction, blockage, etc.), repeater 205-a may receive signals transmitted between base station 105-a and UE 115-a, amplify received signals, and forward the amplified signals to facilitate efficient communications between base station 105-a and UE 115-a.

For example, to support communications between base station 105-a and UE 115-a, repeater 205-a may amplify and forward SSBs (e.g., to relay system information to UEs 115), as well as amplify and forward RACH messaging (e.g., to facilitate UE 115 random access procedures). As such, repeater 205-a may facilitate UE 115-a attachment (e.g., connection) to base station 105-a (e.g., via relay of system information and random access messaging). Further, repeater 205-a may relay communications between base station 105-a and UE 115-a following UE 115-a attachment (e.g., communications over an establish connection between base station 105-a and UE 115-a).

As discussed herein, repeater 205-a may be configured to perform relay operations (e.g., wireless repeater operations, such as signal amplification, signal phase rotation, signal forwarding, etc.) to reduce or minimize path loss or interference for various communications in various environments. In some cases, the repeater may be configured via base station 105-a control signaling. For example, base station 105-a may control parameters of repeater 205-a forwarding such as amplification, direction, frequency gains, frequency translation, etc. for various communications (e.g., synchronization signaling, random access signaling, connected mode signaling, etc.) between base station 105-a and UE 115-a. As such, a repeater 205-a may monitor an out of band control channel 210 (e.g., a sub-6 GHz PDCCH) for control information 215 from base station 105-a in order to perform (e.g., configure) relay duties (e.g., amplification and forwarding operations for mmW communications between the base station 105-a and UE 115-a).

However, in some cases, diligent monitoring for control information (e.g., monitoring of every slot of an out of band control channel) may be associated with high power consumption at the repeater 205-a. Further, in cases where a UE 115 is not attached to the repeater 205-a or the base station 105-a, such monitoring for control information may be inefficient, as relay duties may be less likely to be configured or may be less frequently configured in such cases. For example, repeater 205-a may not be aware of whether or not any UE 115 (e.g., such as UE 115-a) is attached to it (e.g., attached to base station 105-a through repeater 205-a). As such, in order to not miss control information for relay duties (e.g., control information for configuring amplification and forwarding duties), repeater 205-a may monitor out of band control channel 210 relatively frequently (e.g., every slot), which may result in substantial power consumption by repeater 205-a.

As such, one or more aspects of the techniques described herein may provide for repeater 205-a power savings in the absence of measured energy levels that satisfy a configured threshold (e.g., in the absence of an attached or connected UE 115). For example, repeater 205-a may operate a digital interface 235 that monitors for out of band control information in a power saving mode (e.g., a slow state), and the repeater 205-a may monitor for out of band control information 215 from base station 105-a according to a relatively long monitoring periodicity. Upon detection of possible UE attachment to the base station 105-a (e.g., upon detection of a mmW signal 220 from UE 115-a), repeater 205-a may transition to monitoring for out of band control information 215 from base station 105-a according to a fast state (e.g., according to a relatively short, or more frequent, monitoring periodicity). A repeater 205-a may thus more efficiently monitor for out of band control information 215 in the presence or absence of an attached UE 115-a. In some examples, one or more integrated circuits (e.g., transceivers, processors, etc.) of repeater 205-a may implement the power savings techniques discussed herein to reduce overall power consumption for the repeater 205

When no UE 115 is attached to repeater 205-a (e.g., when measured mmW energy levels are less than some digital interface 235 triggering threshold), repeater 205-a may monitor out of band control channel 210 for control information 215 less frequently (e.g., repeater 205-a may operate in a slow state). Repeater 205-a operation in a slow state may refer to a repeater monitoring an out of band control channel 210 according to a monitoring periodicity associated with a relatively long interval, a repeater powering off a control digital interface (e.g., radio frequency circuitry for monitoring out of band control channel 210) for relatively longer durations between out of band control channel 210 monitoring, etc. In such a slow state, repeater 205-a may monitor for mmW signals (e.g., signals 220) in one or more preconfigured slots (e.g., RACH slots), to determine whether a UE 115 is attached to it (e.g., or whether a UE 115 is attempting to attach to it) via comparison of measured energy levels to a threshold. In some examples, a threshold for repeater 205-a energy measurements may be received via control signaling (e.g., downlink control information (DCI), radio resource control (RRC) signaling, MAC control element (MAC-CE), etc.) by repeater 205-a. In some cases, base station 105-a may dynamically adjust the threshold. For example, base station 105-a may transmit a first threshold for repeater 205-a energy measurements at a first time and transmit a second threshold for repeater 205-a energy measurements different from the first threshold at a second time subsequent to the first time based on one or more characteristics associated with a UE 115. In some cases, the one or more characteristics associated with a UE 115 may be based on whether a UE 115 attached to the base station 105-a. In some cases, the one or more characteristics associated with a UE 115 may correspond to a characteristic known by the base station 105-a that is either transparent to or unknowable by the repeater 205-a (e.g., a characteristic associated with communications between the UE 115 and the base station 105-a).

That is, repeater 205-a may measure mmW energy (e.g., measure signal 220 energy) in one or more RACH slots to determine whether UE 115-a is attached to repeater 205-a (e.g., or base station 105-a), or whether UE 115-a is attempting to attach to repeater 205-a (e.g., or base station 105-a). If repeater 205-a determines a measured energy level is greater than a threshold, repeater 205-a may power digital interface 235 or may configure digital interface 235 to monitor out of band control channel 210 more frequently (e.g., according to a tentative fast state). Repeater 205-a operation in a tentative fast state may refer to a repeater monitoring an out of band control channel 210 according to a monitoring periodicity associated with a relatively short interval (e.g., in every slot of the out of band control channel 210), a repeater powering on digital interface 235 (e.g., radio frequency circuitry for monitoring out of band control channel 210), a repeater powering off a digital interface 235 for relatively shorter durations between out of band control channel 210 monitoring, etc. As discussed herein, repeater 205-a may operate in a tentative fast state (upon detection of a signal 220) until additional control information 215 is received, until a digital interface timer expires (e.g., prior to receiving additional control information 215), etc. Alternatively, if repeater 205-a does not determine a measured energy level exceeds the threshold, the repeater 205-a may go back to operating in a slow state or in a low power state until the next preconfigured monitoring slot (e.g., until the next preconfigured RACH slot).

A repeater 205-a may include various combinations of hardware (e.g., based on manufacturing cost considerations, repeater functionality considerations, etc.). For example, a repeater 205-a may include an analog block 230 and a digital interface 235. Generally, analog block 230 may refer to various components or circuitry for analog processing, as described in more detail herein. Similarly, digital interface 235 may refer to various components or circuitry for digital processing, as described in more detail herein. In some cases, analog block 230 may be used to measure energy levels of signals 220 received in mmW spectrum, to amplify received mmW signals 220, to forward amplified mmW signals 220, etc. For example, repeater 205-a may employ an analog block 230 to amplify and forward a signal 220 received in a configured slot to base station 105-a (e.g., and RACH detection or signal decoding may be performed at the base station 105-a). Digital interface 235 may be used to receive control information 215 (e.g., to monitor out of band control channel 210). In some cases, digital interface 235 may include or refer to a digital block, a control interface, a control digital interface, an out of band interface, a sub-6 GHz NB-IoT modem, etc.

Repeater 205-a may thus be equipped with an analog block 230 for receive energy measurement or energy level detection. Repeater 205-a may determine or identify an attached UE (e.g., or a UE attempting to attach) when one or more measured energy levels are greater than a threshold. For example, repeater 205-a may measure one or more energy levels during one or more preconfigured slots, and may determine or identify an attached UE (or a UE attempting to attach) when the one or more measured energy levels are greater than the threshold.

Upon determination that a measured energy level (e.g., a mmW energy measurement) is greater than a threshold, repeater 205-a may power digital interface 235 or transition digital interface 235 to a tentative fast state (e.g., and monitor out of band control channel 210 more frequently for control information 215). The UE 115-a may remain such a tentative fast state until additional control information 215 (e.g., information configuring the control interface of the UE 115-a) is received, until a monitoring periodicity transition timer expires, etc. For example, repeater 205-a may set a timer (e.g., a digital interface timer) to receive a fast command (e.g., a control command configuring a short control channel monitoring interval, a control command configuring a frequent control channel monitoring periodicity, etc.) from base station 105-a upon determining a measured energy level in mmW spectrum is greater than a threshold. If no command is received prior to expiration of the timer, repeater 205-a may transition the digital interface 235 back to a slow state (e.g., otherwise, repeater 205-a may transition the digital interface 235 to a fast state). As such, base station 105-a may transmit digital interface 235 configuration information (e.g., a fast command) to repeater 205-a (e.g., in control information 215 via out of band control channel 210) upon reception of a forwarded signal 225 from repeater 205-a.

As discussed, in some cases the fast command may be implicit, such that after the repeater 205-a informs base station 105-a of UE 115-a (e.g., after repeater 205-a transmits forwarded signal 225), the repeater 205-a may move digital interface 235 to a tentative fast state. If no PDCCH (e.g., control information 215) is received before the timer expires, repeater 205-a may transition digital interface 235 back to a slow state. If a PDCCH is received to activate a repeater configuration, repeater 205-a may transition digital interface 235 to a fast state. In some cases, base station 105-a may transmit a slow command (e.g., via control information 215) to move digital interface 235 of the repeater 205-a to a slow rate if no UE is attached to the repeater 205-a. For example, base station 105-a may determine or identify UE 115-a handover to another base station, and may transmit a slow command to repeater 205-a upon identification that the UE 115-a is detaching from the repeater 205-a. Further, base station 105-a may determine or identify UE 115-a handover to itself, and may transmit a fast command to repeater 205-a upon identification that the UE 115-a is attaching to the base station 105-a. In some cases, repeater 205-a may periodically report its state (e.g., the monitoring state of digital interface 235, the digital interface 235 configuration of repeater 205-a, etc.) to base station 105-a.

Generally, base station 105-a may send control commands (e.g., control information 215) to repeater 205-a via out of band control channel 210. The frequency with which the repeater 205-a monitors for control information 215 (e.g., the powering of digital interface 235) may affect power consumption by the repeater 205-a. Techniques described herein may be employed for repeater configuration of a control interface, such as digital interface 235 (e.g., for monitoring for control information 215 from a base station 105-a), based on energy measurements (e.g., mmW energy measurements), for power savings at the repeater 205-a.

Various examples of the components of a repeater 205 (e.g., repeater 205-a in FIG. 2 and repeater 205-b in FIG. 3) and operations of the repeater 205 are described in further detail in the examples of FIGS. 8 through 11. Further, circuitry of a repeater 205 may be configured in other layouts not specifically illustrated in FIGS. 8 through 11. Analog block 230 may include or refer to analog or radio frequency circuitry, may include various components used within a signal processing chain at a repeater 205, etc. For example, analog block 230 may include or refer to analog or radio frequency circuitry, phase shifters, mixers, received signal strength indicator (RSSI) components, LNAs, filters, PAs, A/D converters and/or D/A converters, or a combination thereof. In some cases, the analog block 230 may support analog processing described herein. For example, analog block 230 (e.g., a LNA) may receive a signal (e.g., signal 220), amplify the signal, and forward the signal (e.g., transmit forwarded signal 225) to base station 105-a. Further, analog block 230 may measure energy of a signal (e.g., signal 220) during one or more preconfigured slots (e.g., one or more RACH slots) to determine or identify UE 115-a (e.g., to detect UE 115-a attachment). Upon identification of UE 115-a attachment, a repeater 205 may more frequently monitor out of band control channel 210 for additional or new control information 215.

Digital interface 235 may include or refer to digital circuitry, may include various components used within a signal processing chain at a repeater 205, etc. For example, digital interface 235 may include an A/D converter, and may convert a filtered signal to a digital filtered signal, which may be provided to digital processing and control circuitry. The digital processing and control circuitry may perform digital processing, such as digital filtering, demodulation and decoding, channel estimation, carrier tracking, or combinations thereof, on the received filtered digital signal to output a processed digital signal. In some cases, the digital interface 235 may support digital processing described herein. For example, digital interface 235 may control information 215 received via out of band control channel 210.

As such, analog block 230 may monitor some configured bandwidth in mmW spectrum for relay operations for mmW communications between base station 105-a and UE 115-a. Analog block 230 may be employed to measure energy levels during one or more configured slots. In cases where a measured energy level exceeds a threshold, the repeater 205-a may power digital interface 235 to monitor out of band control channel 210, as discussed herein. In some examples, the repeater 205-a may be configured to transmit forwarded signals 225 when a measured energy level associated with signals 220 exceed the threshold.

In some examples, the repeater 205-a may initially turn off digital interface 235 (e.g., a sub-6 GHz control modem) or may configure digital interface 235 to monitor out of band control channel 210 in a slow rate. The repeater 205-a may turn on an analog block 230 (e.g., which may include or refer to receive modules, forwarding/transmit modules, as well as an energy measurement module), which may operate in a mmW channel, in a preconfigured set of time intervals (e.g., RACH slots). In some cases, on some resources the repeater 205-a may only turn on receive modules and energy measurement modules (e.g., and not transmit modules) to see if base station 105-a wants to indicate something special. If enough energy is detected in the mmW channel (e.g., if the repeater 205-a determines a measured energy level is above a threshold), repeater 205-a may turn on digital interface 235. Base station 105-a may also provide more specific configuration information for energy measurements (e.g., such as time resources, beamforming parameters, uplink/downlink direction used for energy measurement, an energy measurement threshold, etc.).

If no control information 215 is received within a time period (e.g., prior to expiration of a digital interface timer associated with a determination that a measured energy level is greater than a threshold), repeater 205-a may turn off digital interface 235 (e.g., otherwise, repeater 205-a may configure digital interface 235 according to commands received in control information 215). In some examples, repeater 205-a may inform base station 105-a of the configuration of digital interface 235 (e.g., that the digital interface 235 is turned on) using the digital interface 235, and the repeater 205-a may then wait for ON/OFF (e.g., fast or slow) commands from base station 105-a. When repeater 205-a powers digital interface 235 on, repeater 205-a may receive control commands (e.g., via control information 215) from base station 105-a. Base station 105-a may use such control commands to turn off the digital interface 235, set the digital interface 235 to a slow monitoring rate, set the digital interface 235 to a fast monitoring rate, etc.

Figure 3:
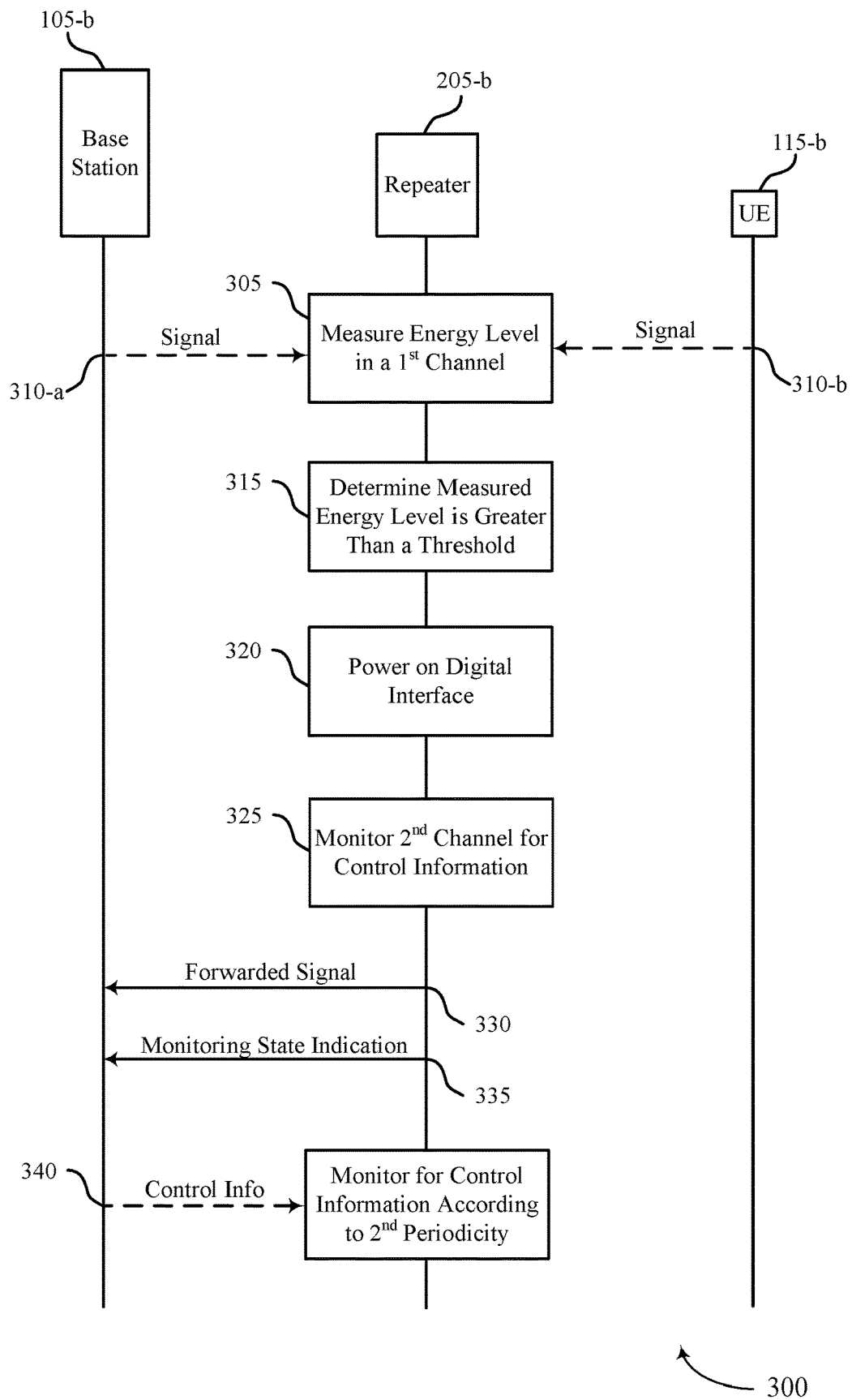
FIG. 3 illustrates an example of a process flow that supports modem control using mmW energy measurement in accordance with one or more aspects of the present disclosure.

FIG. 3 illustrates an example of a process flow 300 that supports modem control using mmW energy measurement in accordance with one or more aspects of the present disclosure. In some examples, process flow 300 may implement aspects of wireless communications system 100 and/or wireless communications system 200. The process flow 300 includes a base station 105-b, which may be an example of base stations and network devices described with reference to FIGS. 1 and 2; a repeater 205-b, which may be an example of repeaters (e.g., wireless repeaters) described with reference to FIGS. 1 and 2; and a UE 115-b, which may be an example of a UE described with reference to FIGS. 1 and 2. The process flow 300 includes functions and communications implemented by base station 105-b, repeater 205-b, and UE 115-b in the context of management of repeaters (e.g., for power savings at a repeater).

In the following description of the process flow 300, the operations between base station 105-b, repeater 205-b, and UE 115-b may be transmitted in a different order than the order shown, or the operations may be performed in different orders or at different times. Certain operations may also be left out of the process flow 300, or other operations may be added to the process flow 300. It is to be understood that while base station 105-b, repeater 205-b, and UE 115-b are shown performing a number of the operations of process flow 300, any wireless device may perform the operations shown.

At 305, repeater 205-b may measure an energy level in a first channel (e.g., a mmW channel) during one or more configured slots (e.g., during one or more configured RACH slots). For example, repeater 205-b may measure the energy level in a mmW channel, using an analog interface, during one or more RACH slots. In some cases, the repeater 205-b may receive (e.g., in prior signaling from the base station 105-b) configuration information indicative of the one or more configured slots, one or more beamforming parameters, an uplink or downlink direction to be used for the measuring of the energy level, the threshold, or some combination thereof. For example, in some cases, the configuration information may indicate an absolute value of the energy level or a relative value of the energy level compared to energy detected in resources other than the one or more configured slots At 310, repeater 205-b may receive or detect a signal (e.g., based on a configuration of the repeater). For example, in some cases, repeater 205-b may be configured to forward on the downlink, in which case repeater 205-b may monitor for a signal from base station 105-b and receive a transmission at 310-a. In other cases, repeater 205-b may be configured to forward on the uplink, in which case repeater 205-b may monitor for a transmission from UE 115-b and receive a transmission at 310-b. In some cases, repeater 205-b may perform forwarding operations, and forward the transmission received at 320-a or 320-b, according to configuration of the repeater 205-b.

As such, in some cases, at 310-a, base station 105-b may transmit a signal (e.g., a RACH message) during the one or more configured slots. In other cases, at 310-b, UE 115-b may transmit a signal (e.g., a RACH message) during the one or more configured slots. At 315, repeater 205-b may determine that the measured energy level satisfies a threshold (e.g., when the measured energy level is greater than a threshold). At 320, repeater 205-*b* may power on a digital interface (e.g., a digital interface of a modem supporting sub-6 GHz communications). In some cases, the powering of the digital interface may be based on the determination that the measured energy level exceeds the threshold (e.g., the determination at 315).

At 325, repeater 205-*b* may monitor a second channel (e.g., a sub-6 GHz channel), using the digital interface powered at 320, for control information. For example, repeater 205-*b* may monitor a sub-6 GHz channel, using the digital interface, for control information from base station 105-*b*. In some cases, repeater 205-*b* may set a digital interface timer based on the determination that the measured energy level is above the threshold, where the repeater 205-*b* may monitor for additional control information from base station 105-*b*, using the digital interface, for the duration of the timer. For example, if additional control information is not received from base station 105-*b* prior to expiration of the digital interface timer, the repeater 205-*b* may turn off the digital interface or return to operating the digital interface in a low power or slow state. In cases where control information is received from base station 105-*b* prior to expiration of the digital interface timer, the repeater 205-*b* may configure the digital interface in accordance with the control information (e.g., in accordance with one or more commands for the digital interface included in the control information).

At 330, repeater 205-*b* may forward a signal (e.g., forward the signal received from UE 115-*b* at 310-*b* to base station 105-*b* or forward the signal received from base station 105-*b* at 310-*a* to UE 115-*b*). For example, repeater 205-*b* may perform relay operations (e.g., amplification and forward operations) described herein, to relay the signal (e.g., the RACH message) received from UE 115-*b* at 310-*b* to base station 105-*b*.

At 335, repeater 205-*b* may transmit using the digital interface, an indication of a monitoring state of the digital interface to base station 105-*b* (e.g., where the monitoring state of the digital interface is based on the powering of the digital interface). For example, the indication of the monitoring state of the digital interface may indicate the digital interface is powered on, is operating in a tentative fast state, is operating in a fast state, is operating in a slow state, etc.

At 340, repeater 205-*b* may, in some cases, receive control information from base station 105-*b* while monitoring the second channel (e.g., a sub-6 GHz channel) for control information using the digital interface. For example, the control information may be received prior to expiration of a digital interface timer maintained by the repeater 205-*b*, and the repeater 205-*b* may configure the digital interface based on the control information. In some cases, configuring the digital interface includes powering on the digital interface, powering off the digital interface, configuring a monitoring periodicity of the digital interface, configuring one or more resources to be monitored by the digital interface, or some combination thereof (e.g., based on the one or more commands included in the control information).

In some examples, the repeater 205-*b* may receive the out of band control information based on the monitoring of the second channel (e.g., at 340), and the repeater 205-*b* may then perform an amplification and forward operation in the first channel for a radio frequency analog signal (e.g., for a radio frequency signal from base station 105-*b* to UE 115-*b*, or from UE 115-*b* to base station 105-*b*) based on the out of band control information. In some cases, the out of band control information may indicate a receive beam direction for a radio frequency analog signal, a receive time interval for the radio frequency analog signal, a transmit beam direction for the radio frequency analog signal, a transmit time interval for the radio frequency analog signal, or some combination thereof. In some cases, the out of band control information received at 340 may configure the digital interface (e.g., powered by the repeater 205-*b* at 320). For example, the control information may include one or more commands for the repeater 205-*b* to power on (e.g., or continue to power) the digital interface, to power off the digital interface (e.g., transition the digital interface back to a slow state or low power state), to configure the digital interface with a monitoring periodicity (e.g., a monitoring periodicity that may be indicated by the control information), to configure the digital interface to monitor one or more resources (e.g., one or more resources that may be indicated by the control information), etc.

In some examples, the repeater 205-*b* may initially (e.g., prior to determining the measured energy level is greater than the threshold at 315) monitor the second channel, using the digital interface, for control information according to a first monitoring periodicity. Upon determining that the measured energy level is greater than the threshold (e.g., at 315) the repeater 205-*b* may transition from monitoring the second channel according to the first monitoring periodicity to monitoring the second channel according to a second monitoring periodicity (e.g., where the second monitoring periodicity is associated with a shorter monitoring interval than the first monitoring periodicity). That is, in some cases, powering the digital interface at 320 may refer to transitioning from monitoring the second channel (e.g., the out of band control channel) according to the first monitoring periodicity to monitoring the second channel according to a second monitoring periodicity (e.g., powering the digital interface at 320 may refer to the repeater 205-*b* transitioning to monitoring the second channel more frequently).

Figure 4:
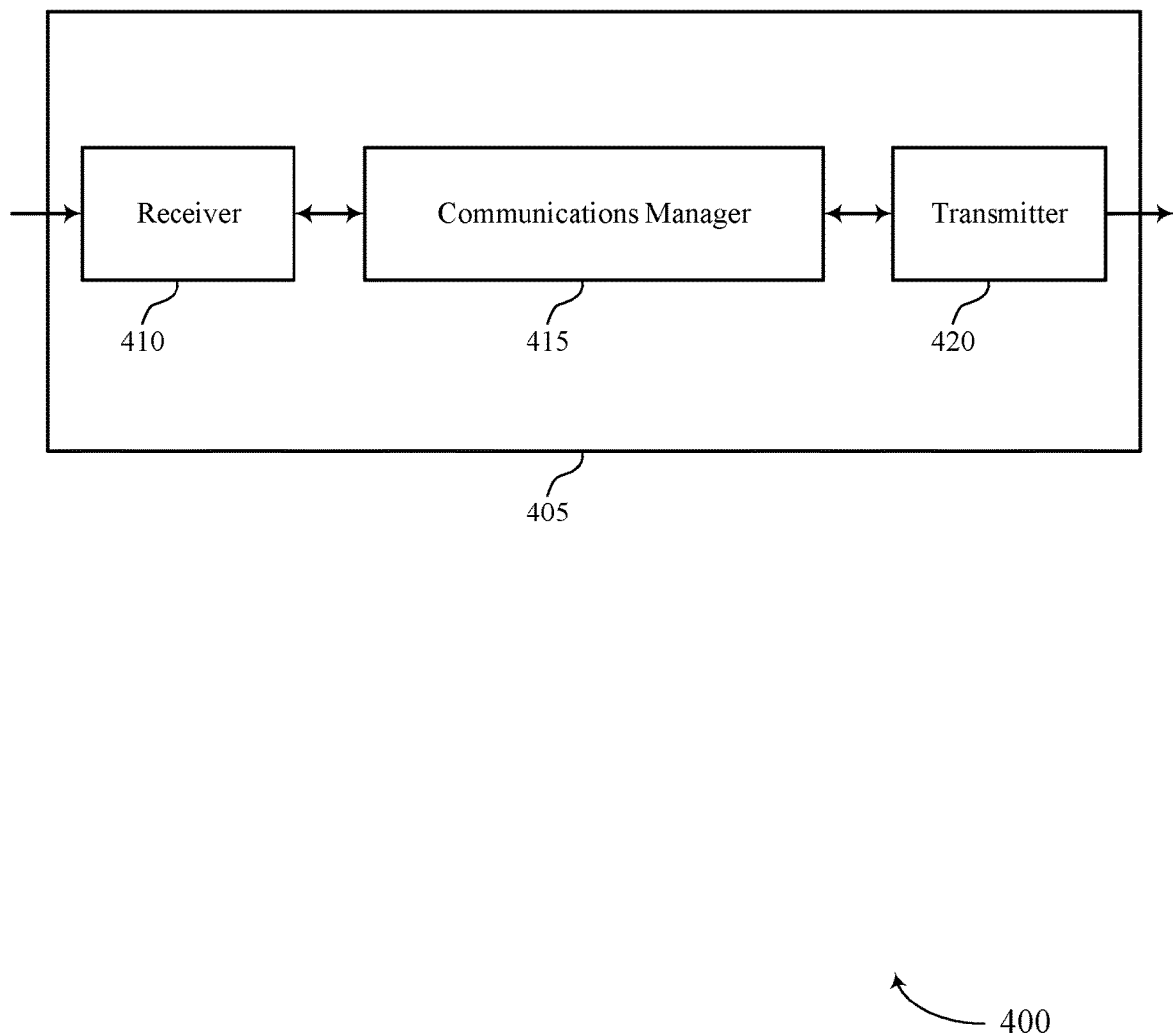
FIGS. 4 and 5 show block diagrams of devices that support modem control using mmW energy measurement in accordance with one or more aspects of the present disclosure.

FIG. 4 shows a block diagram 400 of a device 405 that supports modem control using mmW energy measurement in accordance with one or more aspects of the present disclosure. The device 405 may be an example of aspects of a base station 105 or a network device 105 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to modem control using mmW energy measurement, etc.). Information may be passed on to other components of the device 405. The receiver 410 may be an example of aspects of the transceiver 720 described with reference to FIG. 7. The receiver 410 may utilize a single antenna or a set of antennas.

The receiver 410 may be an example of means for performing various aspects of power saving of smart repeaters as described herein. The receiver 410, or its sub-components, may be implemented in hardware (e.g., in receiver or transceiver circuitry). The circuitry may comprise a processor, a digital signal processor (DSP), an application-specific integrated circuit (ASIC), a field programmable gate array (FPGA), or other programmable logic device, discrete gate or transistor logic, discrete hardware components, or any combination thereof designed to perform the functions described in the present disclosure.

In some examples or implementations, receiver 410, or its sub-components, may be implemented in code (e.g., as receiver or transceiver management software or firmware) executed by a processor, or any combination thereof. If implemented in code executed by a processor, the functions of the receiver 410, or its sub-components may be executed by a general-purpose processor, a DSP, an ASIC, a FPGA, or other programmable logic device.

The communications manager 415 may receive, from a wireless repeater in a first channel, an indication of a radio frequency analog signal, receive, from the wireless repeater in a second channel, an indication of a monitoring state of a digital interface of the wireless repeater, where the monitoring state of the digital interface is based on a powering of the digital interface, a monitoring periodicity of the digital interface, or both, and transmit, to the wireless repeater in the second channel, control information based on the indication of the monitoring state of the digital interface of the wireless repeater. The communications manager 415 may be an example of aspects of the communications manager 710 described herein.

The communications manager 415 may be an example of means for performing various aspects of power saving of smart repeaters as described herein. The communications manager 415, or its sub-components, may be implemented in hardware (e.g., in communications management circuitry). The circuitry may comprise a processor, a DSP, an ASIC, a FPGA, or other programmable logic device, discrete gate or transistor logic, discrete hardware components, or any combination thereof designed to perform the functions described in the present disclosure.

In some examples or implementations, communications manager 415, or its sub-components, may be implemented in code (e.g., as communications management software or firmware) executed by a processor, or any combination thereof. If implemented in code executed by a processor, the functions of the communications manager 415, or its sub-components may be executed by a general-purpose processor, a DSP, an ASIC, a FPGA, or other programmable logic device.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 415 to provide or support a means for performing various operations (e.g., receiving, determining, processing, performing, and transmitting) using or otherwise in cooperation with the receiver 410, transmitter 420, or both.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

The transmitter 420 may be an example of means for performing various aspects of power saving of smart repeaters as described herein. The transmitter 420, or its sub-components, may be implemented in hardware (e.g., in transmitter or transceiver circuitry). The circuitry may comprise a DSP, an ASIC, a FPGA, or other programmable logic device, discrete gate or transistor logic, discrete hardware components, or any combination thereof designed to perform the functions described in the present disclosure.

In some examples or implementations, transmitter 420, or its sub-components, may be implemented in code (e.g., as transmitter or transceiver management software or firmware) executed by a processor, or any combination thereof. If implemented in code executed by a processor, the functions of the transmitter 420, or its sub-components may be executed by a general-purpose processor, a DSP, am ASIC, a FPGA, or other programmable logic device.

Figure 5:
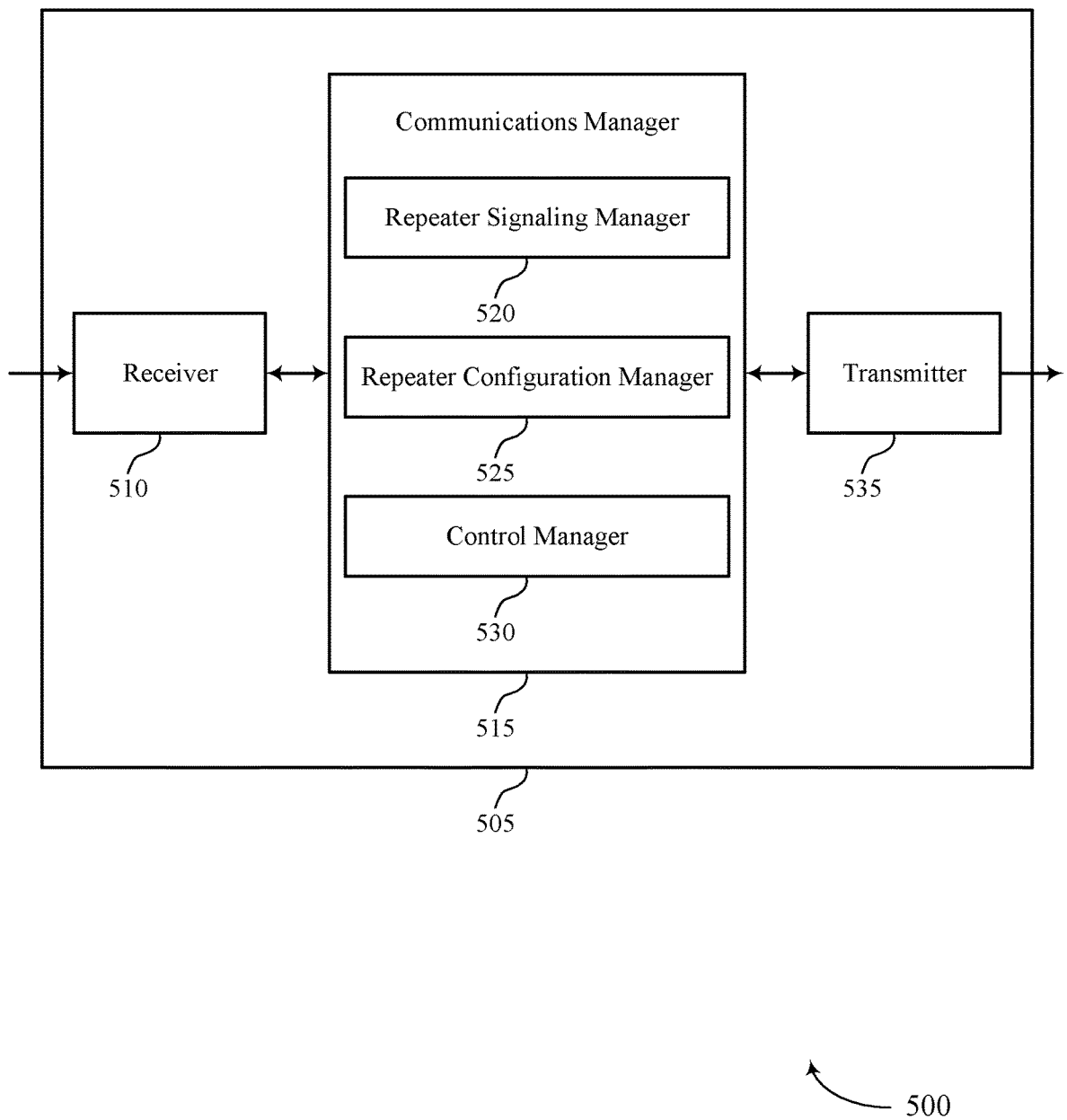

FIG. 5 shows a block diagram 500 of a device 505 that supports modem control using mmW energy measurement in accordance with one or more aspects of the present disclosure. The device 505 may be an example of aspects of a device 405, base station 105, or a network device 105 as described herein. The device 505 may include a receiver 510, a communications manager 515, and a transmitter 535. The device 505 may also include a processor. Each of these components may be in communication with one another (e.g., via one or more buses).

The receiver 510 may receive or provide means for receiving information such as packets, user data, or control information associated with various information channels (e.g., control channels, data channels, and information related to modem control using mmW energy measurement, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a repeater signaling manager 520, a repeater configuration manager 525, and a control manager 530. The communications manager 515 may be an example of aspects of the communications manager 710 described herein.

The repeater signaling manager 520 may receive or provide means for receiving, from a wireless repeater in a first channel, an indication of a radio frequency analog signal. The repeater configuration manager 525 may receive or provide means for receiving, from the wireless repeater in a second channel, an indication of a monitoring state of a digital interface of the wireless repeater, where the monitoring state of the digital interface is based on a powering of the digital interface, a monitoring periodicity of the digital interface, or both. The control manager 530 may transmit or provide means for transmitting, to the wireless repeater in the second channel, control information based on the indication of the monitoring state of the digital interface of the wireless repeater.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
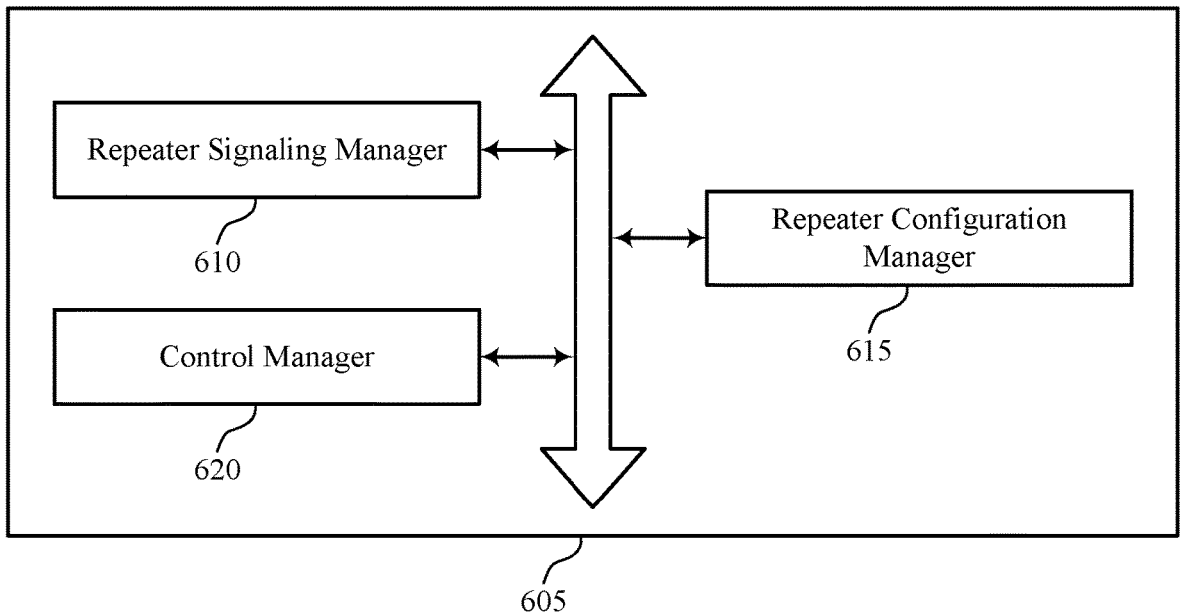
FIG. 6 shows a block diagram of a communications manager that supports modem control using mmW energy measurement in accordance with one or more aspects of the present disclosure.

FIG. 6 shows a block diagram 600 of a communications manager 605 that supports modem control using mmW energy measurement in accordance with one or more aspects of the present disclosure. The communications manager 605 may be an example of aspects of a communications manager 415, a communications manager 515, or a communications manager 710 described herein. The communications manager 605 may include a repeater signaling manager 610, a repeater configuration manager 615, and a control manager 620. Each of these modules may communicate, directly or indirectly, with one another (e.g., via one or more buses).

The repeater signaling manager 610 may receive or provide means for receiving, from a wireless repeater in a first channel, an indication of a radio frequency analog signal. In some examples, the repeater signaling manager 610 may receive or provide means for receiving an amplified and forwarded radio frequency analog signal from the wireless repeater based on the control information.

The repeater configuration manager 615 may receive or provide means for receiving, from the wireless repeater in a second channel, an indication of a monitoring state of a digital interface of the wireless repeater, where the monitoring state of the digital interface is based on a powering of the digital interface, a monitoring periodicity of the digital interface, or both. In some examples, the repeater configuration manager 615 may transmit or provide means for transmitting, to the wireless repeater, configuration information indicative of one or more configured slots, one or more beamforming parameters, an uplink or downlink direction, a threshold, or some combination thereof, for wireless repeater measurement of an energy level in the first channel. In some cases, the configuration information indicative of the threshold includes an absolute value of the energy level or a relative value of the energy level compared to energy detected in resources other than the one or more configured slots.

The control manager 620 may transmit or provide means for transmitting, to the wireless repeater in the second channel, control information based on the indication of the monitoring state of the digital interface of the wireless repeater. In some cases, the control information includes one or more commands for the digital interface of the wireless repeater. In some cases, the one or more commands are indicative of powering on the digital interface of the wireless repeater, powering off the digital interface of the wireless repeater, a monitoring periodicity of the digital interface of the wireless repeater, one or more resources to be monitored by the digital interface of the wireless repeater, or some combination thereof. In some cases, the control information indicates a receive beam direction for a radio frequency analog signal, a receive time interval for the radio frequency analog signal, a transmit beam direction for the radio frequency analog signal, a transmit time interval for the radio frequency analog signal, or some combination thereof. In some cases, the first channel includes a millimeter wave channel and the second channel includes a sub-6 gigahertz channel.

Figure 7:
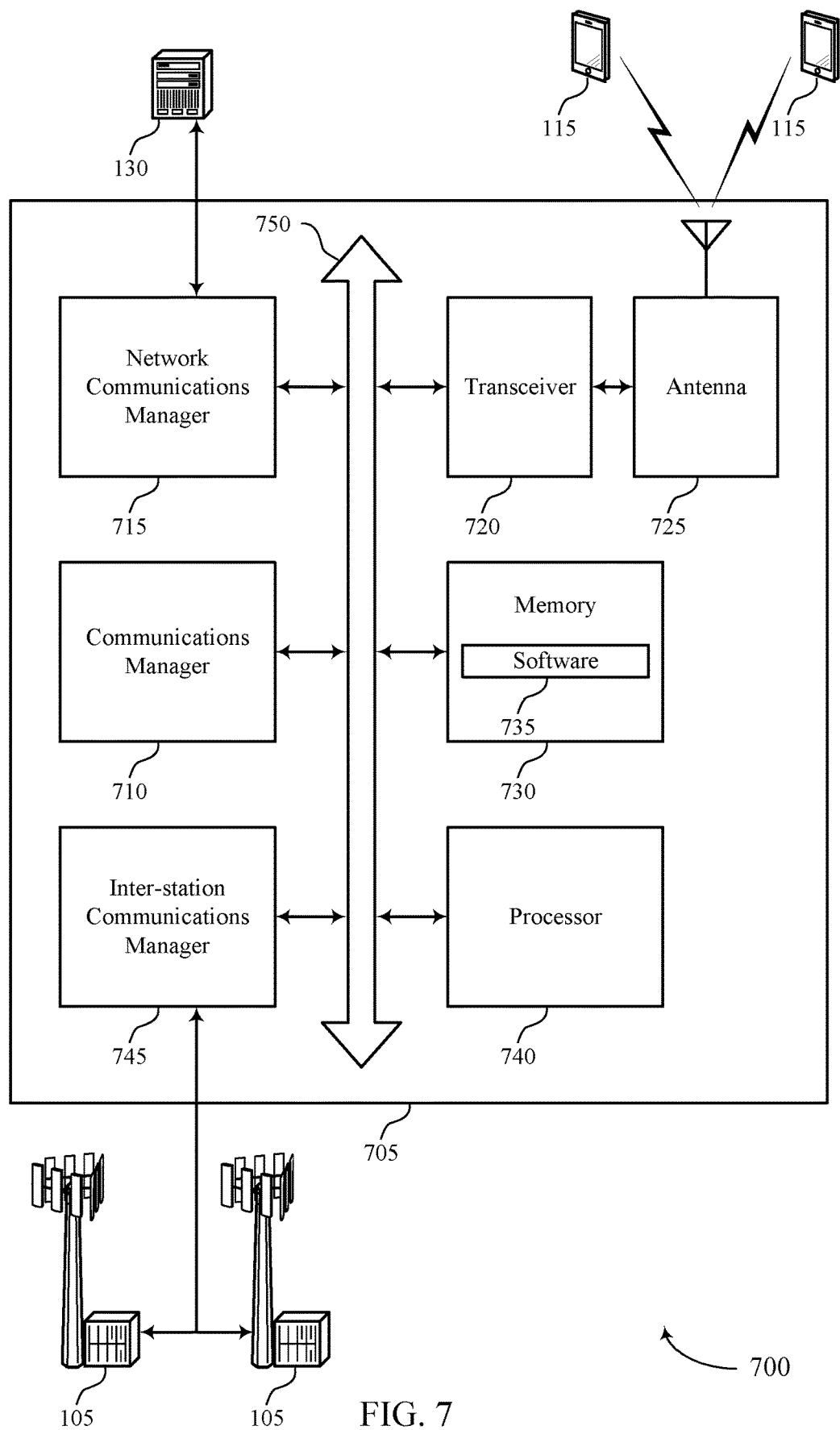
FIG. 7 shows a diagram of a system including a device that supports modem control using mmW energy measurement in accordance with one or more aspects of the present disclosure.

FIG. 7 shows a diagram of a system 700 including a device 705 that supports modem control using mmW energy measurement in accordance with one or more aspects of the present disclosure. The device 705 may be an example of or include the components of device 405, device 505, a base station 105, or a network device 105 as described herein. The device 705 may include components for bi-directional voice and data communications including components for transmitting and receiving communications, including a communications manager 710, a network communications manager 715, a transceiver 720, an antenna 725, memory 730, a processor 740, and an inter-station communications manager 745. These components may be in electronic communication via one or more buses (e.g., bus 750).

The communications manager 710 may receive or provide means for receiving, from a wireless repeater in a first channel, an indication of a radio frequency analog signal, receive, from the wireless repeater in a second channel, an indication of a monitoring state of a digital interface of the wireless repeater, where the monitoring state of the digital interface is based on a powering of the digital interface, a monitoring periodicity of the digital interface, or both, and transmit, to the wireless repeater in the second channel, control information based on the indication of the monitoring state of the digital interface of the wireless repeater, where the control information is associated with a radio frequency analog signal in a first channel.

The network communications manager 715 may manage communications with the core network (e.g., via one or more wired backhaul links). For example, the network communications manager 715 may manage the transfer of data communications for client devices, such as one or more UEs 115.

The transceiver 720 may communicate or provide means for communicating bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM, ROM, or a combination thereof. The memory 730 may store computer-readable code or software 735 including instructions that, when executed by a processor (e.g., the processor 740) cause the device to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some cases, a memory controller may be integrated into processor 740. The processor 740 may be configured to execute computer-readable instructions stored in a memory (e.g., the memory 730) to cause the device 705 to perform various functions (e.g., functions or tasks supporting modem control using mmW energy measurement).

The inter-station communications manager 745 may manage communications with other base station 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communication network technology to provide communication between base stations 105.

The software 735 may include instructions to implement aspects of the present disclosure, including instructions to support wireless communications. The software 735 may be stored in a non-transitory computer-readable medium such as system memory or other type of memory. In some cases, the software 735 may not be directly executable by the processor 740 but may cause a computer (e.g., when compiled and executed) to perform functions described herein.

Figure 8:
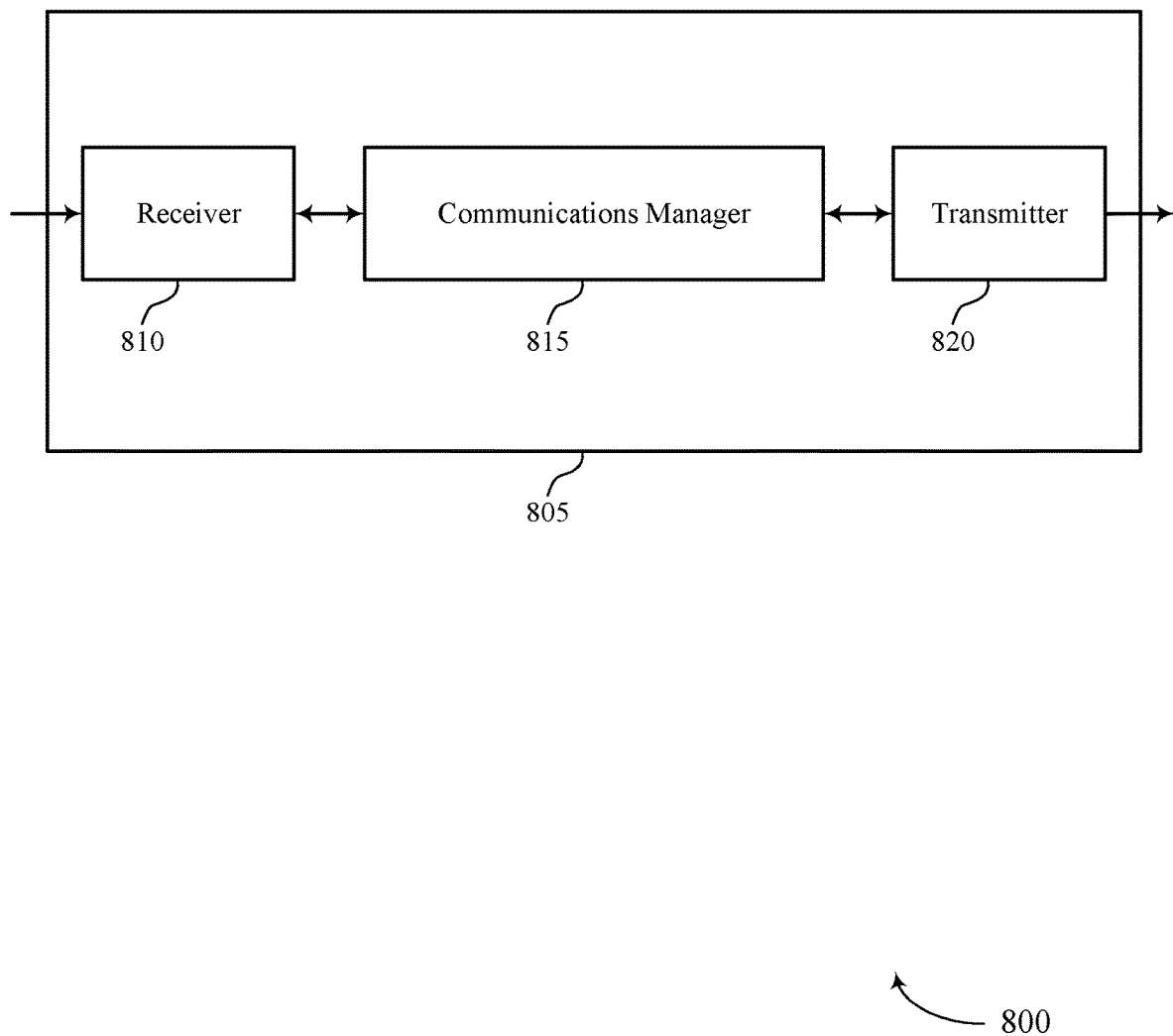
FIGS. 8 and 9 show block diagrams of devices that support modem control using mmW energy measurement in accordance with one or more aspects of the present disclosure.

FIG. 8 shows a block diagram 800 of a device 805 that supports modem control using mmW energy measurement in accordance with one or more aspects of the present disclosure. The device 805 may be an example of aspects of a repeater 140, a repeater 205, or a wireless repeater as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to modem control using mmW energy measurement, etc.). Information may be passed on to other components of the device 805. The receiver 810 may be an example of aspects of the transceiver 1120 described with reference to FIG. 11. The receiver 810 may utilize a single antenna or a set of antennas.

The receiver 810 may be an example of means for performing various aspects of managing and power saving of smart repeaters as described herein. The receiver 810, or its sub-components, may be implemented in hardware (e.g., in receiver or transceiver circuitry). The circuitry may comprise a processor, a DSP, an ASIC, a FPGA, or other programmable logic device, discrete gate or transistor logic, discrete hardware components, or any combination thereof designed to perform the functions described in the present disclosure.

In some examples or implementations, receiver 810, or its sub-components, may be implemented in code (e.g., as receiver or transceiver management software or firmware) executed by a processor, or any combination thereof. If implemented in code executed by a processor, the functions of the receiver 810, or its sub-components may be executed by a general-purpose processor, a DSP, an ASIC, a FPGA, or other programmable logic device.

The communications manager 815 may measure an energy level in a first channel during one or more configured slots, determine the measured energy level is greater than a threshold, power on a digital interface based on the determination that the measured energy level is greater than the threshold, and monitor a second channel, using the digital interface, for control information. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA, or other programmable logic device, discrete gate or transistor logic, discrete hardware components, or any combination thereof designed to perform the functions described in the present disclosure.

The communications manager 815 may be an example of means for performing various aspects of managing and power saving of smart repeaters as described herein. The communications manager 815, or its sub-components, may be implemented in hardware (e.g., in communications management circuitry). The circuitry may comprise a processor, a DSP, an ASIC, a FPGA, or other programmable logic device, discrete gate or transistor logic, discrete hardware components, or any combination thereof designed to perform the functions described in the present disclosure.

In some examples or implementations, communications manager 815, or its sub-components, may be implemented in code (e.g., as communications management software or firmware) executed by a processor, or any combination thereof. If implemented in code executed by a processor, the functions of the communications manager 815, or its sub-components may be executed by a general-purpose processor, a DSP, an ASIC, a FPGA, or other programmable logic device.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 815 may be configured to perform various operations (e.g., receiving, measuring, monitoring, determining, powering on or off, setting, transitioning, amplifying, forwarding, processing, performing, configuring, and transmitting) using or otherwise in cooperation with the receiver 810, transmitter 820, or both.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

The transmitter 820 may be an example of means for performing various aspects of managing and power saving of smart repeaters as described herein. The transmitter 820, or its sub-components, may be implemented in hardware (e.g., in transmitter or transceiver circuitry). The circuitry may comprise a DSP, an ASIC, a FPGA, or other programmable logic device, discrete gate or transistor logic, discrete hardware components, or any combination thereof designed to perform the functions described in the present disclosure.

In some examples or implementations, transmitter 820, or its sub-components, may be implemented in code (e.g., as transmitter or transceiver management software or firmware) executed by a processor, or any combination thereof. If implemented in code executed by a processor, the functions of the transmitter 820, or its sub-components may be executed by a general-purpose processor, a DSP, an ASIC, a FPGA, or other programmable logic device.

Figure 9:
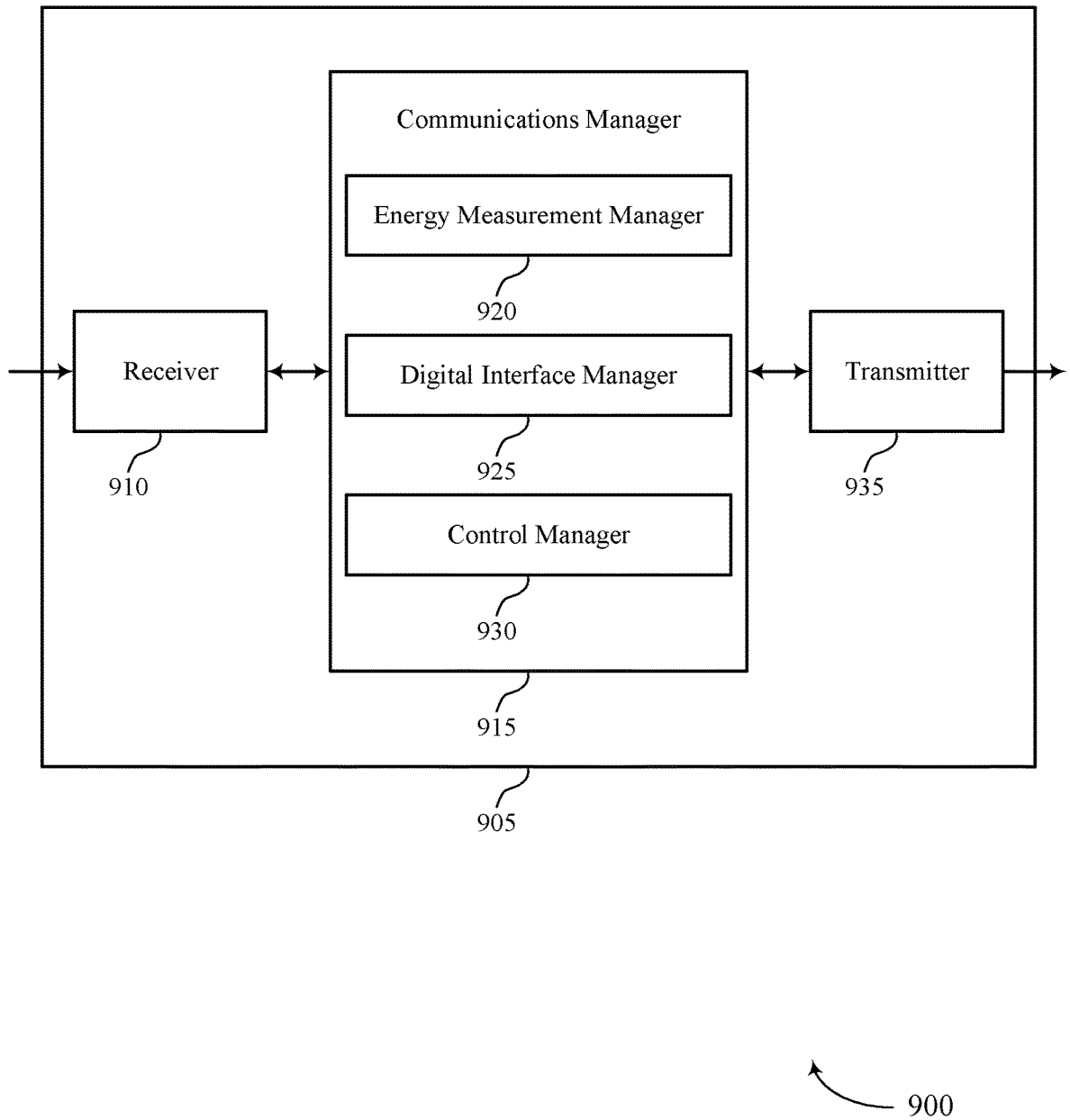

FIG. 9 shows a block diagram 900 of a device 905 that supports modem control using mmW energy measurement in accordance with one or more aspects of the present disclosure. The device 905 may be an example of aspects of a device 805, a repeater 140, a repeater 205, or a wireless repeater as described herein. The device 905 may include a receiver 910, a communications manager 915, and a transmitter 935. The device 905 may also include a processor. Each of these components may be in communication with one another (e.g., via one or more buses).

The receiver 910 may receive or provide means for receiving information such as packets, user data, or control information associated with various information channels (e.g., control channels, data channels, and information related to modem control using mmW energy measurement, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an energy measurement manager 920, a digital interface manager 925, and a control manager 930. The communications manager 915 may be an example of aspects of the communications manager 1110 described herein.

The energy measurement manager 920 may measure or provide means for measuring an energy level in a first channel during one or more configured slots and determine the measured energy level is greater than a threshold. The digital interface manager 925 may power or provide means for powering on a digital interface based on the determination that the measured energy level is greater than the threshold. The control manager 930 may monitor or provide means for monitoring a second channel, using the digital interface, for control information.

The transmitter 935 may transmit or provide means for transmitting signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
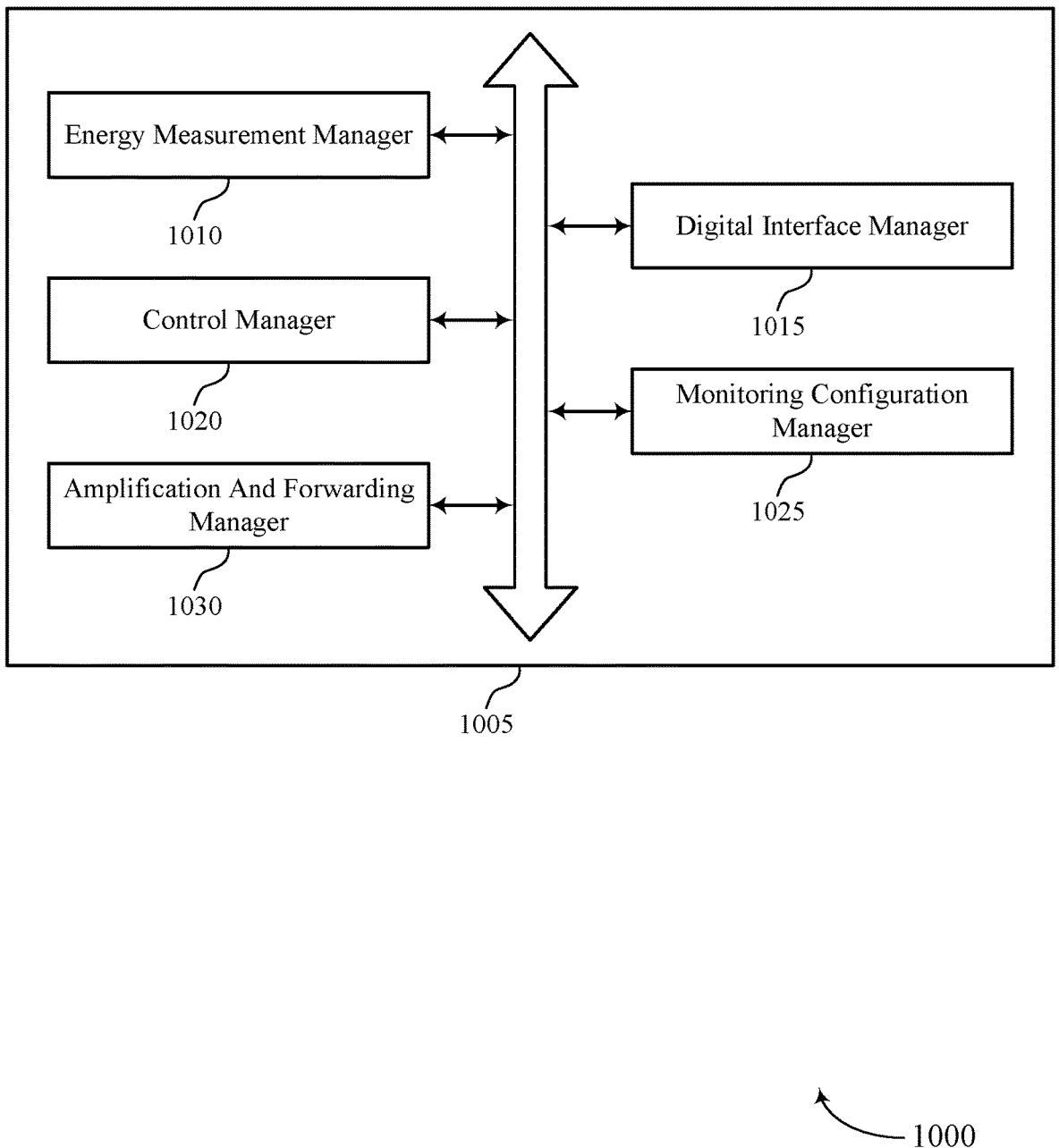
FIG. 10 shows a block diagram of a communications manager that supports modem control using mmW energy measurement in accordance with one or more aspects of the present disclosure.

FIG. 10 shows a block diagram 1000 of a communications manager 1005 that supports modem control using mmW energy measurement in accordance with one or more aspects of the present disclosure. The communications manager 1005 may be an example of aspects of a communications manager 815, a communications manager 915, or a communications manager 1110 described herein. The communications manager 1005 may include an energy measurement manager 1010, a digital interface manager 1015, a control manager 1020, a monitoring configuration manager 1025, and an amplification and forwarding manager 1030. Each of these modules may communicate, directly or indirectly, with one another (e.g., via one or more buses).

The energy measurement manager 1010 may measure or provide means for measuring an energy level in a first channel during one or more configured slots. In some examples, the energy measurement manager 1010 may determine or provide means for determining the measured energy level is greater than a threshold. In some examples, the energy measurement manager 1010 may measure or provide means for measuring the energy level in a millimeter wave channel, using an analog interface, during one or more random access channel slots. In some cases, the wireless device is configured to measure the energy level in a first bandwidth of the first channel and monitor the control information in a second bandwidth of the second channel. In some cases, the second bandwidth is less than the first bandwidth.

The digital interface manager 1015 may power on or provide means for powering on a digital interface based on the determination that the measured energy level is greater than the threshold. In some examples, the digital interface manager 1015 may monitor or provide means for monitoring a sub-6 gigahertz channel, using the digital interface, for control information from a base station. In some examples, the digital interface manager 1015 may set or provide means for setting a digital interface timer based on the determination that the measured energy level is greater than the threshold. In some examples, the digital interface manager 1015 may power off or provide means for powering off the digital interface based on expiration of the digital interface timer. In some examples, the digital interface manager 1015 may configure or provide means for configuring the digital interface based on the one or more commands. In some examples, the digital interface manager 1015 may power on or provide means for powering on the digital interface, powering off the digital interface, configuring a monitoring periodicity of the digital interface, configuring one or more resources to be monitored by the digital interface, or some combination thereof, based on the one or more commands.

In some examples, the digital interface manager 1015 may monitor or provide means for monitoring the second channel, using the digital interface, for control information according to a first monitoring periodicity. In some examples, the digital interface manager 1015 may receive or provide means for receiving out of band control information based on the monitoring of the second channel. In some cases, the out of band control information indicates a receive beam direction for a radio frequency analog signal, a receive time interval for the radio frequency analog signal, a transmit beam direction for the radio frequency analog signal, a transmit time interval for the radio frequency analog signal, or some combination thereof.

The control manager 1020 may monitor or provide means for monitoring a second channel, using the digital interface, for control information. In some examples, receiving, from a base station, control information prior to expiration of the digital interface timer based on the monitoring of the second channel, where the control information includes one or more commands for the digital interface. In some examples, receiving, from a base station, control information based on the monitoring of the second channel, where the control information includes one or more commands for the digital interface. In some cases, the wireless device includes a wireless repeater.

The monitoring configuration manager 1025 may receive or provide means for receiving, from a base station, configuration information indicative of the one or more configured slots, one or more beamforming parameters, an uplink or downlink direction to be used for the measuring of the energy level, the threshold, or some combination thereof. In some examples, the monitoring configuration manager 1025 may transmit or provide means for transmitting, using the digital interface, an indication of a monitoring state of the digital interface to a base station, where the monitoring state of the digital interface is based on the powering of the digital interface. In some examples, the monitoring configuration manager 1025 may transition or provide means for transitioning from monitoring the second channel according to the first monitoring periodicity to monitoring the second channel according to a second monitoring periodicity based on the determination that the measured energy level in the first channel is greater than the threshold, where the second monitoring periodicity is associated with a shorter monitoring interval than the first monitoring periodicity. In some cases, the configuration information indicative of the threshold includes an absolute value of the energy level or a relative value of the energy level compared to energy detected in resources other than the one or more configured slots.

The amplification and forwarding manager 1030 may perform or provide means for performing an amplification and forward operation in the first channel for a radio frequency analog signal based on the out of band control information.

Figure 11:
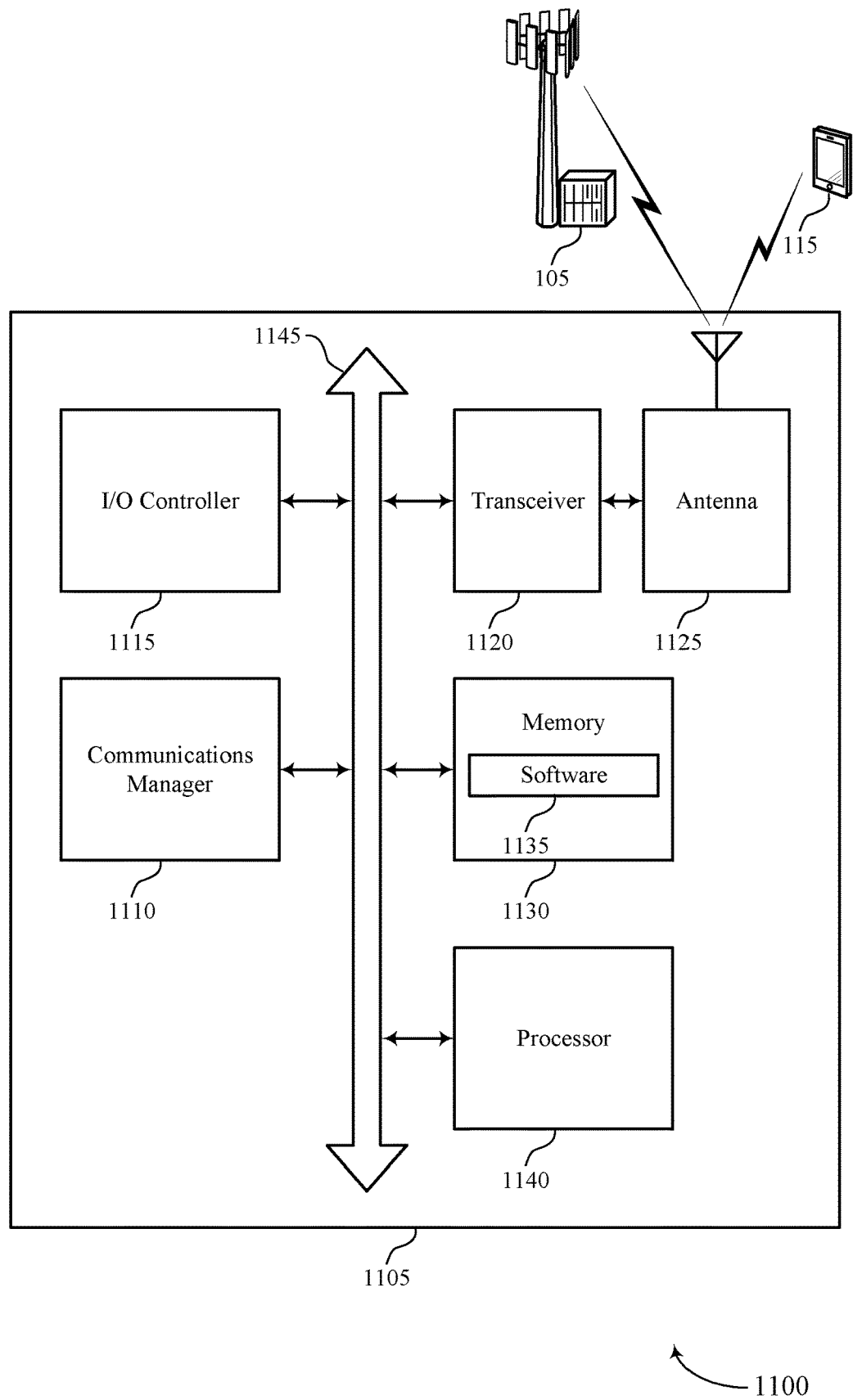
FIG. 11 shows a diagram of a system including a device that supports modem control using mmW energy measurement in accordance with one or more aspects of the present disclosure.

FIG. 11 shows a diagram of a system 1100 including a device 1105 that supports modem control using mmW energy measurement in accordance with one or more aspects of the present disclosure. The device 1105 may be an example of or include the components of device 805, device 905, repeater 140, a repeater 205, or a wireless repeater as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may measure or provide means for measuring an energy level in a first channel during one or more configured slots, determine the measured energy level is greater than a threshold, power on a digital interface based on the determination that the measured energy level is greater than the threshold, and monitor a second channel, using the digital interface, for control information.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate or provide means for communicating bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code or software 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting modem control using mmW energy measurement).

The software 1135 may include instructions to implement aspects of the present disclosure, including instructions to support wireless communications. The software 1135 may be stored in a non-transitory computer-readable medium such as system memory or other type of memory. In some cases, the software 1135 may not be directly executable by the processor 1140 but may cause a computer (e.g., when compiled and executed) to perform functions described herein.

Figure 12:
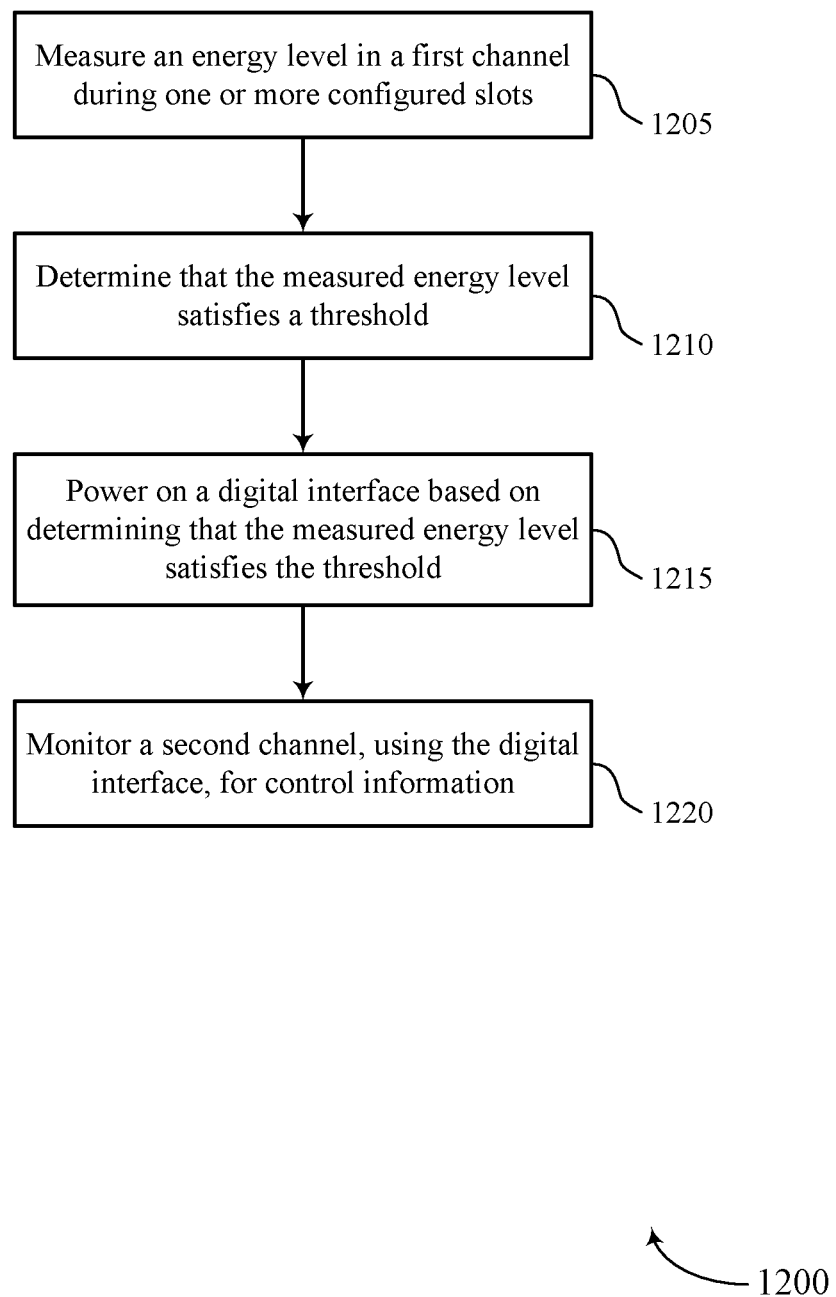
FIGS. 12 through 16 show flowcharts illustrating methods that support modem control using mmW energy measurement in accordance with one or more aspects of the present disclosure.

FIG. 12 shows a flowchart illustrating a method 1200 that supports modem control using mmW energy measurement in accordance with one or more aspects of the present disclosure. The operations of method 1200 may be implemented by a device (such as, for example, a wireless repeater) or its components as described herein. For example, the operations of method 1200 may be performed by a communications manager as described with reference to FIGS. 8 through 11. In some examples, a device may execute a set of instructions to control the functional elements of the device to perform the functions described below. Additionally or alternatively, a device may perform aspects of the functions described below using special-purpose hardware.

At 1205, the device may measure an energy level in a first channel during one or more configured slots. The operations of 1205 may be performed according to the methods described herein. In some examples, aspects of the operations of 1205 may be performed by an energy measurement manager as described with reference to FIGS. 8 through 11.

At 1210, the device may determine that the measured energy level satisfies a threshold. In some cases, the device may receive, from the base station, signaling that indicates the threshold. The operations of 1210 may be performed according to the methods described herein. In some examples, aspects of the operations of 1210 may be performed by an energy measurement manager as described with reference to FIGS. 8 through 11.

At 1215, the device may power on a digital interface based on determining that the measured energy level satisfies the threshold. The operations of 1215 may be performed according to the methods described herein. In some examples, aspects of the operations of 1215 may be performed by a digital interface manager as described with reference to FIGS. 8 through 11.

At 1220, the device may monitor a second channel, using the digital interface, for control information. The operations of 1220 may be performed according to the methods described herein. In some examples, aspects of the operations of 1220 may be performed by a control manager as described with reference to FIGS. 8 through 11.

Figure 13:
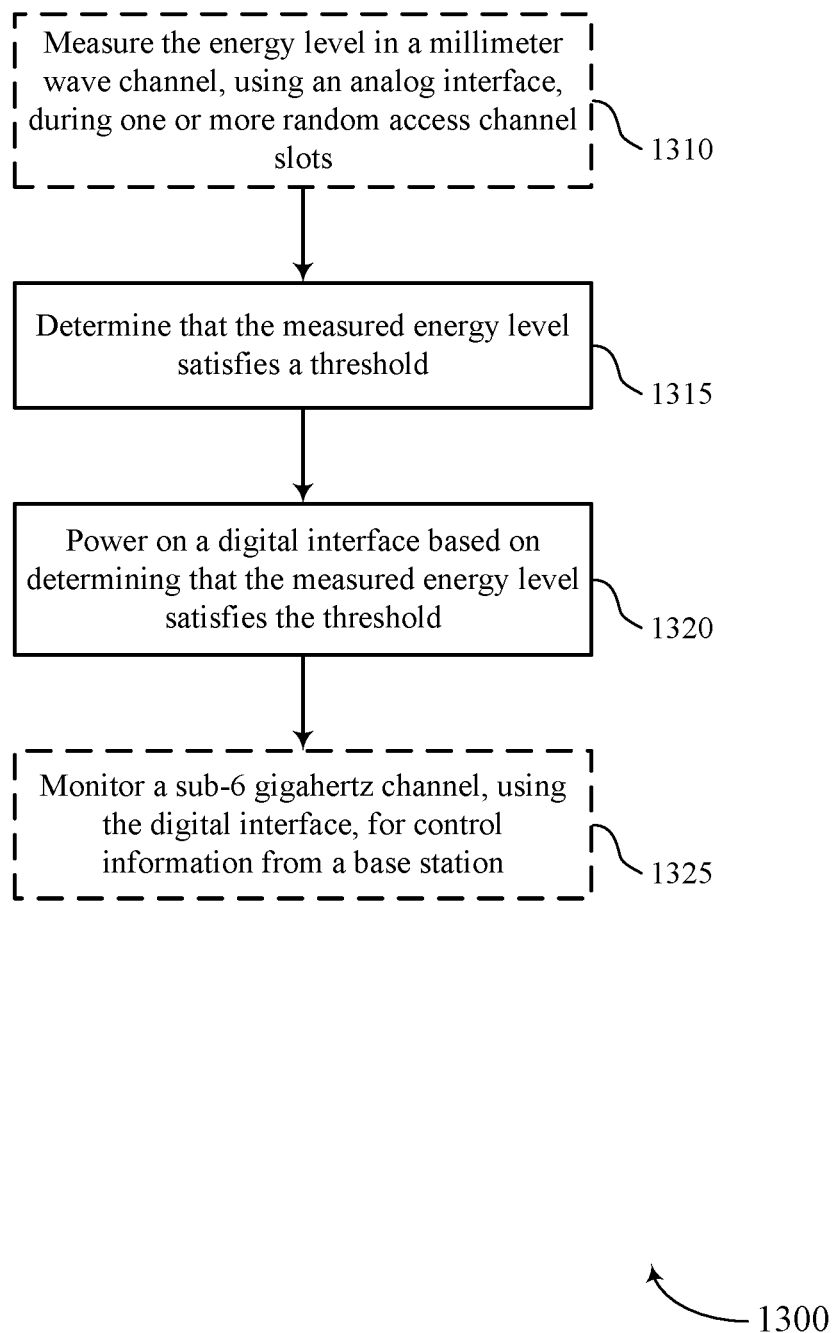

FIG. 13 shows a flowchart illustrating a method 1300 that supports modem control using mmW energy measurement in accordance with one or more aspects of the present disclosure. The operations of method 1300 may be implemented by a device (such as, for example, a wireless repeater) or its components as described herein. For example, the operations of method 1300 may be performed by a communications manager as described with reference to FIGS. 8 through 11. In some examples, a device may execute a set of instructions to control the functional elements of the device to perform the functions described below. Additionally or alternatively, a device may perform aspects of the functions described below using special-purpose hardware.

At 1305, the device may measure the energy level in a millimeter wave channel, using an analog interface, during one or more random access channel slots. The operations of 1305 may be performed according to the methods described herein. In some examples, aspects of the operations of 1305 may be performed by an energy measurement manager as described with reference to FIGS. 8 through 11.

At 1310, the device may determine that the measured energy level satisfies a threshold. The operations of 1310 may be performed according to the methods described herein. In some examples, aspects of the operations of 1310 may be performed by an energy measurement manager as described with reference to FIGS. 8 through 11.

At 1315, the device may power on a digital interface based on determining that the measured energy level satisfies the threshold. The operations of 1315 may be performed according to the methods described herein. In some examples, aspects of the operations of 1315 may be performed by a digital interface manager as described with reference to FIGS. 8 through 11.

At 1320, the device may monitor a sub-6 gigahertz channel, using the digital interface, for control information from a base station. The operations of 1320 may be performed according to the methods described herein. In some examples, aspects of the operations of 1320 may be performed by a digital interface manager as described with reference to FIGS. 8 through 11.

Figure 14:
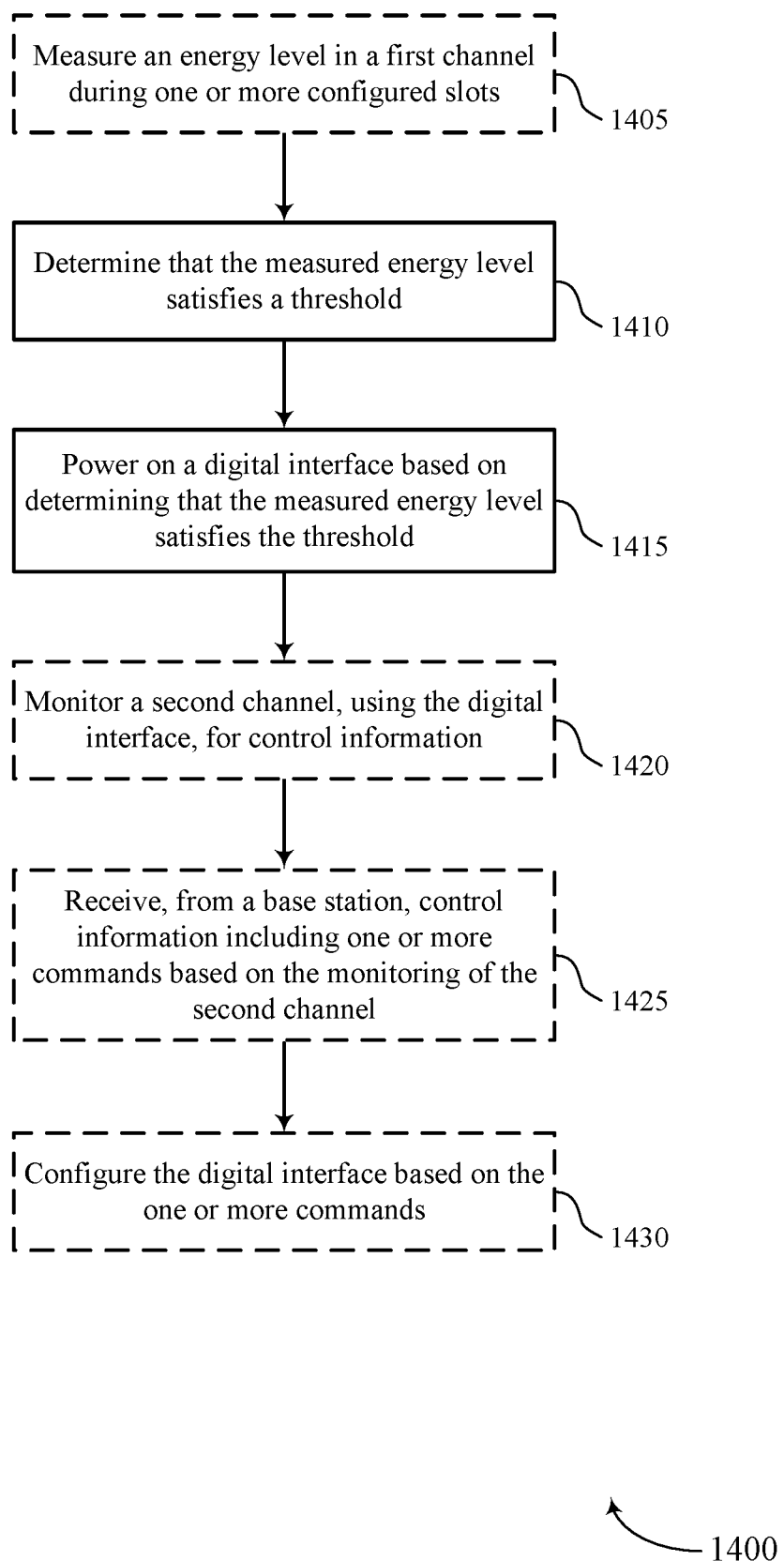

FIG. 14 shows a flowchart illustrating a method 1400 that supports modem control using mmW energy measurement in accordance with one or more aspects of the present disclosure. The operations of method 1400 may be implemented by a device (such as, for example, a wireless repeater) or its components as described herein. For example, the operations of method 1400 may be performed by a communications manager as described with reference to FIGS. 8 through 11. In some examples, a device may execute a set of instructions to control the functional elements of the device to perform the functions described below. Additionally or alternatively, a device may perform aspects of the functions described below using special-purpose hardware.

At 1405, the device may measure an energy level in a first channel during one or more configured slots. The operations of 1405 may be performed according to the methods described herein. In some examples, aspects of the operations of 1405 may be performed by an energy measurement manager as described with reference to FIGS. 8 through 11.

At 1410, the device may determine the measured energy level is greater than a threshold. The operations of 1410 may be performed according to the methods described herein. In some examples, aspects of the operations of 1410 may be performed by an energy measurement manager as described with reference to FIGS. 8 through 11.

At 1415, the device may power on a digital interface based on the determination that the measured energy level is greater than the threshold. The operations of 1415 may be performed according to the methods described herein. In some examples, aspects of the operations of 1415 may be performed by a digital interface manager as described with reference to FIGS. 8 through 11.

At 1420, the device may monitor a second channel, using the digital interface, for control information. The operations of 1420 may be performed according to the methods described herein. In some examples, aspects of the operations of 1420 may be performed by a control manager as described with reference to FIGS. 8 through 11.

At 1425, the device may receive, from a base station, control information based on the monitoring of the second channel, where the control information includes one or more commands for the digital interface. The operations of 1425 may be performed according to the methods described herein. In some examples, aspects of the operations of 1425 may be performed by a control manager as described with reference to FIGS. 8 through 11.

At 1430, the device may configure the digital interface based on the one or more commands. The operations of 1430 may be performed according to the methods described herein. In some examples, aspects of the operations of 1430 may be performed by a digital interface manager as described with reference to FIGS. 8 through 11.

Figure 15:
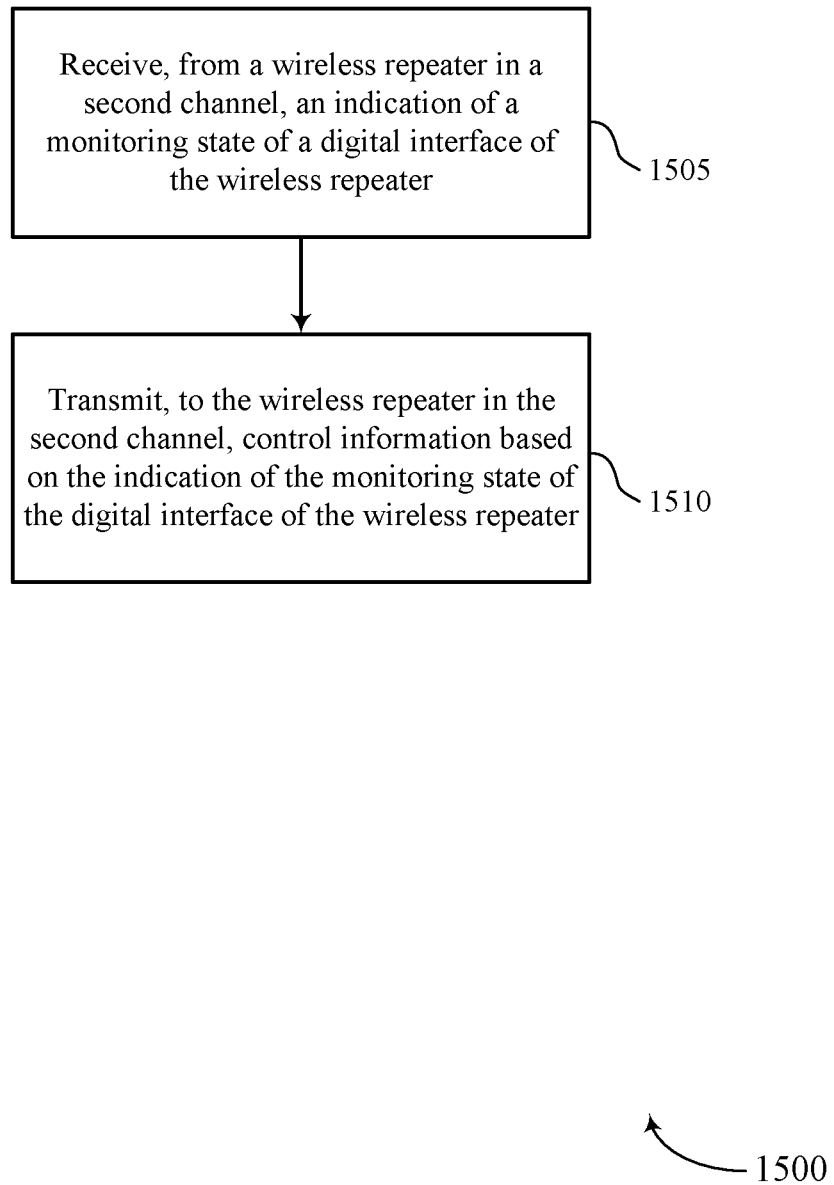

FIG. 15 shows a flowchart illustrating a method 1500 that supports modem control using mmW energy measurement in accordance with one or more aspects of the present disclosure. The operations of method 1500 may be implemented by a base station 105 or its components as described herein. For example, the operations of method 1500 may be performed by a communications manager as described with reference to FIGS. 4 through 7. In some examples, a base station may execute a set of instructions to control the functional elements of the base station to perform the functions described below. Additionally or alternatively, a base station may perform aspects of the functions described below using special-purpose hardware.

At 1505, the base station may receive, from a wireless repeater in a second channel, an indication of a monitoring state of a digital interface of the wireless repeater, where the monitoring state of the digital interface is based on a powering of the digital interface, a monitoring periodicity of the digital interface, or both. The operations of 1505 may be performed according to the methods described herein. In some examples, aspects of the operations of 1505 may be performed by a repeater configuration manager as described with reference to FIGS. 4 through 7.

At 1510, the base station may transmit, to the wireless repeater in the second channel, control information based on the indication of the monitoring state of the digital interface of the wireless repeater, where the control information is associated with a radio frequency analog signal in a first channel. The operations of 1510 may be performed according to the methods described herein. In some examples, aspects of the operations of 1510 may be performed by a control manager as described with reference to FIGS. 4 through 7.

Figure 16:
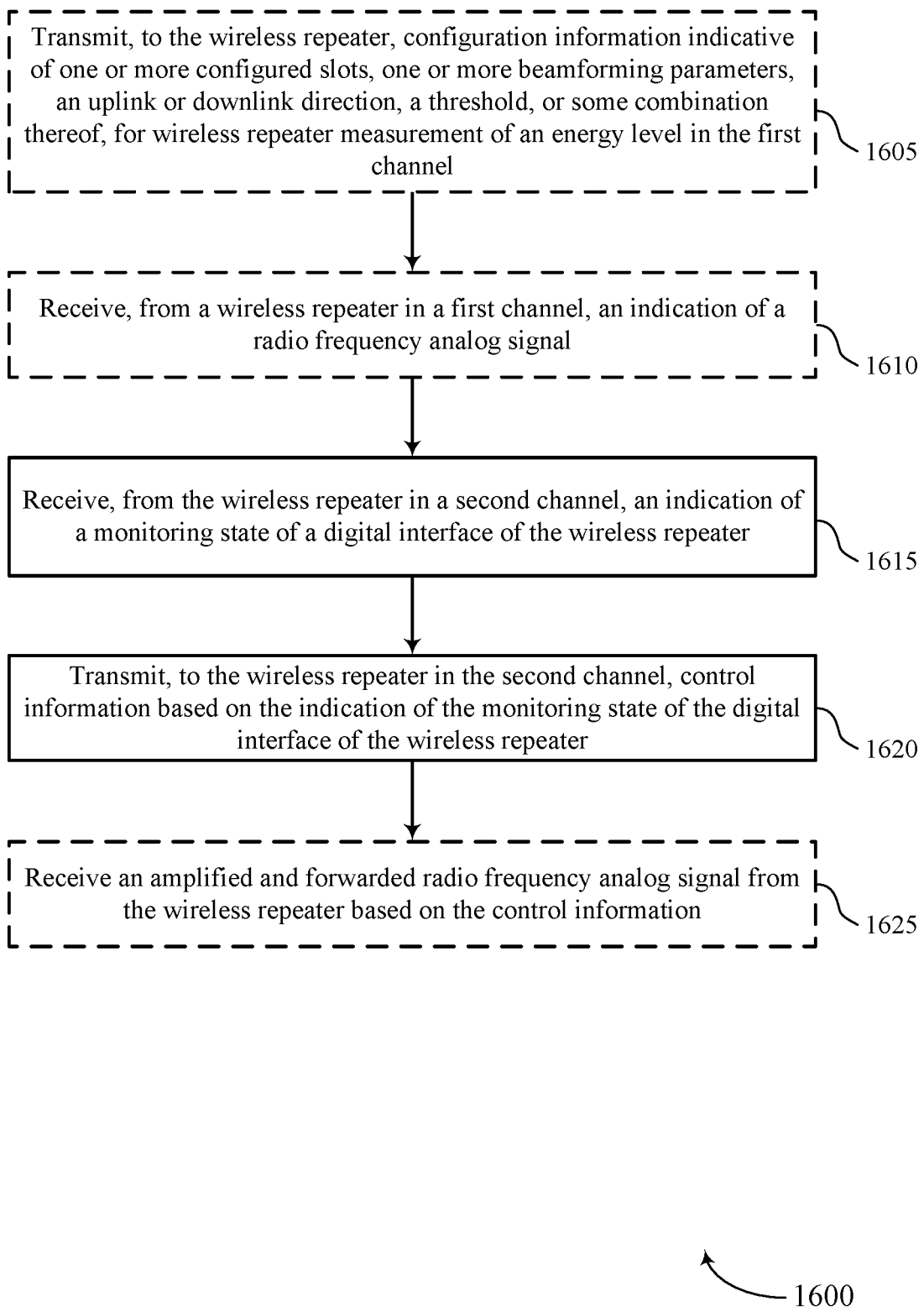

FIG. 16 shows a flowchart illustrating a method 1600 that supports modem control using mmW energy measurement in accordance with one or more aspects of the present disclosure. The operations of method 1600 may be implemented by a base station 105 or its components as described herein. For example, the operations of method 1600 may be performed by a communications manager as described with reference to FIGS. 4 through 7. In some examples, a base station may execute a set of instructions to control the functional elements of the base station to perform the functions described below. Additionally or alternatively, a base station may perform aspects of the functions described below using special-purpose hardware.

At 1605, the base station may transmit, to the wireless repeater, configuration information indicative of one or more configured slots, one or more beamforming parameters, an uplink or downlink direction, a threshold, or some combination thereof, for wireless repeater measurement of an energy level in the first channel. The operations of 1605 may be performed according to the methods described herein. In some examples, aspects of the operations of 1605 may be performed by a repeater configuration manager as described with reference to FIGS. 4 through 7.

At 1610, the base station may receive, from a wireless repeater in a first channel, an indication of a radio frequency analog signal. The operations of 1610 may be performed according to the methods described herein. In some examples, aspects of the operations of 1610 may be performed by a repeater signaling manager as described with reference to FIGS. 4 through 7.

At 1615, the base station may receive, from the wireless repeater in a second channel, an indication of a monitoring state of a digital interface of the wireless repeater. The monitoring state of the digital interface may be based on a powering of the digital interface, a monitoring periodicity of the digital interface, or both. The operations of 1615 may be performed according to the methods described herein. In some examples, aspects of the operations of 1615 may be performed by a repeater configuration manager as described with reference to FIGS. 4 through 7.

At 1620, the base station may transmit, to the wireless repeater in the second channel, control information based on the indication of the monitoring state of the digital interface of the wireless repeater. The control information may indicate a receive beam direction for a radio frequency analog signal, a receive time interval for the radio frequency analog signal, a transmit beam direction for the radio frequency analog signal, a transmit time interval for the radio frequency analog signal, or some combination thereof. The operations of 1620 may be performed according to the methods described herein. In some examples, aspects of the operations of 1620 may be performed by a control manager as described with reference to FIGS. 4 through 7.

At 1625, the base station may receive an amplified and forwarded radio frequency analog signal from the wireless repeater based on the control information. The operations of 1625 may be performed according to the methods described herein. In some examples, aspects of the operations of 1625 may be performed by a repeater signaling manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1: A method for wireless communication at a wireless device, comprising: measuring an energy level in a first channel during one or more configured slots; determining that the measured energy level satisfies a threshold; powering on a digital interface based at least in part on the determining that the measured energy level satisfies the threshold; and monitoring a second channel, using the digital interface, for control information.

Example 2: The method of example 1, the measuring comprising: measuring the energy level in a millimeter wave channel, using an analog interface, during one or more random access channel slots.

Example 3: The method of example 1 or 2, the monitoring comprising: monitoring a sub-6 gigahertz channel, using the digital interface, for control information from a base station.

Example 4: The method of any one of examples 1 through 3, further comprising: receiving, from a base station, signaling that indicates the threshold.

Example 5: The method of any one of examples 1 through 4, further comprising: receiving, from a base station, configuration information indicative of the one or more configured slots, one or more beamforming parameters, an uplink or downlink direction to be used for the measuring of the energy level, the threshold, or some combination thereof.

Example 6: The method of any one of examples 1 through 5, wherein the configuration information indicative of the threshold comprises an absolute value of the energy level or a relative value of the energy level compared to energy detected in resources other than the one or more configured slots.

Example 7: The method of any one of examples 1 through 6, further comprising: setting a digital interface timer based at least in part on the determining that the measured energy level satisfies the threshold.

Example 8: The method of any one of examples 1 through 7, further comprising: powering off the digital interface based at least in part on expiration of the digital interface timer.

Example 9: The method of any one of examples 1 through 8, further comprising: receiving, from a base station, control information prior to expiration of the digital interface timer based at least in part on the monitoring of the second channel, wherein the control information comprises one or more commands for the digital interface; and configuring the digital interface based at least in part on the one or more commands.

Example 10: The method of any one of examples 1 through 9, the configuring comprising: powering on the digital interface, powering off the digital interface, configuring a monitoring periodicity of the digital interface, configuring one or more resources to be monitored by the digital interface, or some combination thereof, based at least in part on the one or more commands.

Example 11: The method of any one of examples 1 through 10, further comprising: transmitting, using the digital interface, an indication of a monitoring state of the digital interface to a base station, wherein the monitoring state of the digital interface is based at least in part on the powering of the digital interface.

Example 12: The method of any one of examples 1 through 11, further comprising: receiving, from a base station, control information based at least in part on the monitoring of the second channel, wherein the control information comprises one or more commands for the digital interface; and configuring the digital interface based at least in part on the one or more commands.

Example 13: The method of any one of examples 1 through 12, the configuring comprising: powering on the digital interface, powering off the digital interface, configuring a monitoring periodicity of the digital interface, configuring one or more resources to be monitored by the digital interface, or some combination thereof, based at least in part on the one or more commands.

Example 14: The method of any one of examples 1 through 13, further comprising: monitoring the second channel, using the digital interface, for control information according to a first monitoring periodicity; and transitioning from monitoring the second channel according to the first monitoring periodicity to monitoring the second channel according to a second monitoring periodicity based at least in part on the determining that the measured energy level satisfies the threshold, wherein the second monitoring periodicity is associated with a shorter monitoring interval than the first monitoring periodicity.

Example 15: The method of any one of examples 1 through 14, wherein the wireless device comprises a wireless repeater.

Example 16: The method of any one of examples 1 through 15, wherein the wireless device is configured to measure the energy level in a first bandwidth of the first channel and monitor the control information in a second bandwidth of the second channel.

Example 17: The method of any one of examples 1 through 16, wherein the second bandwidth is less than the first bandwidth.

Example 18: The method of any one of examples 1 through 17, further comprising: receiving out of band control information based at least in part on the monitoring of the second channel; and performing an amplification and forward operation in the first channel for a radio frequency analog signal based at least in part on the out of band control information.

Example 19: The method of any one of examples 1 through 18, wherein the out of band control information indicates a receive beam direction for the radio frequency analog signal, a receive time interval for the radio frequency analog signal, a transmit beam direction for the radio frequency analog signal, a transmit time interval for the radio frequency analog signal, or some combination thereof.

Example 20: A method of wireless communication at a base station, comprising: receiving, from a wireless device in a second channel, an indication of a monitoring state of a digital interface of the wireless device, wherein the monitoring state of the digital interface is based at least in part on a powering of the digital interface, a monitoring periodicity of the digital interface, or both; and transmitting, to the wireless device in the second channel, control information based at least in part on the indication of the monitoring state of the digital interface of the wireless device, wherein the control information is associated with a radio frequency analog signal in a first channel.

Example 21: The method of example 20 further comprising: transmitting, to the wireless device, configuration information indicative of one or more configured slots, one or more beamforming parameters, an uplink or downlink direction, a threshold, or some combination thereof, for wireless repeater measurement of an energy level in the first channel.

Example 22: The method of example 20 or 21, wherein the configuration information indicative of the threshold comprises an absolute value of the energy level or a relative value of the energy level compared to energy detected in resources other than the one or more configured slots.

Example 23: The method of any one of examples 20 through 22, wherein the first channel comprises a millimeter wave channel and the second channel comprises a sub-6 gigahertz channel.

Example 24: The method of any one of examples 20 through 23, wherein the control information comprises one or more commands for the digital interface of the wireless device.

Example 25: The method of any one of examples 20 through 24, wherein the one or more commands are indicative of powering on the digital interface of the wireless device, powering off the digital interface of the wireless device, a monitoring periodicity of the digital interface of the wireless device, one or more resources to be monitored by the digital interface of the wireless device, or some combination thereof.

Example 26: The method of any one of examples 20 through 25, wherein the control information indicates a receive beam direction for a radio frequency analog signal, a receive time interval for the radio frequency analog signal, a transmit beam direction for the radio frequency analog signal, a transmit time interval for the radio frequency analog signal, or some combination thereof.

Example 27: The method of any one of examples 20 through 26, further comprising: receiving an amplified and forwarded radio frequency analog signal from the wireless repeater based at least in part on the control information.

Example 28: The method of any one of examples 20 through 27, wherein the wireless device comprises a wireless repeater.

Example 29: An apparatus for wireless communications comprising a processor and memory coupled to the processor, the processor and memory configured to perform a method of any one of examples 1 through 19.

Example 30: An apparatus for wireless communications comprising a processor and memory coupled to the processor, the processor and memory configured to perform a method of any one of examples 20 through 28.

Example 31: An apparatus for wireless communication comprising at least one means for performing a method of any one of examples 1 through 19.

Example 32: An apparatus for wireless communication comprising at least one means for performing a method of any one of examples 20 through 28.

Example 33: A non-transitory computer-readable medium storing code for wireless communication, the code comprising instructions executable by a processor to perform a method of any one of examples 1 through 19.

Example 34: A non-transitory computer-readable medium storing code for wireless communication, the code comprising instructions executable by a processor to perform a method of any one of examples 20 through 28.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a wireless communication device comprising:
one or more memories; and
one or more processors coupled with the one or more memories and configured to cause the wireless communication device to:
measure an energy level, using an analog interface, in a first channel during one or more configured slots;
power on a digital interface based at least in part on the measured energy level satisfying a threshold; and
monitor a second channel, using the digital interface, for control information.

2. The apparatus of claim 1, wherein, to measure the energy level, the one or more processors are configured to cause the wireless communication device to:
measure the energy level in a millimeter wave channel during one or more random access channel slots.

3. The apparatus of claim 1, wherein the one or more processors are configured to cause the wireless communication device to:
receive, from a network entity, signaling that indicates the threshold.

4. The apparatus of claim 1, wherein the one or more processors are configured to cause the wireless communication device to:
receive, from a network entity, configuration information indicative of the one or more configured slots, one or more beamforming parameters, an uplink or downlink direction associated with the energy level, the threshold, or any combination thereof.

5. The apparatus of claim 4, wherein the configuration information indicative of the threshold comprises an absolute value of the energy level or a relative value of the energy level compared to energy detected in one or more resources other than the one or more configured slots.

6. The apparatus of claim 1, wherein the one or more processors are configured to cause the wireless communication device to:
set a digital interface timer based at least in part on the measured energy level satisfying the threshold.

7. The apparatus of claim 6, wherein the one or more processors are configured to cause the wireless communication device to:
power off the digital interface based at least in part on expiration of the digital interface timer.

8. The apparatus of claim 6, wherein the one or more processors are configured to cause the wireless communication device to:
receive, from a network entity, the control information via the second channel prior to expiration of the digital interface timer, wherein the control information comprises one or more commands for the digital interface; and
configure the digital interface based at least in part on the one or more commands.

9. The apparatus of claim 8, wherein, to configure the digital interface, the one or more processors are configured to cause the wireless communication device to:
power on the digital interface, power off the digital interface, configure a monitoring periodicity of the digital interface, configure one or more resources to be monitored by the digital interface, or any combination thereof, based at least in part on the one or more commands.

10. The apparatus of claim 1, further comprising:
a transceiver coupled with the one or more processors, wherein the one or more processors are configured to cause the wireless communication device to:
transmit, using the digital interface, an indication of a monitoring state of the digital interface, wherein the monitoring state of the digital interface is based at least in part on whether the digital interface is powered on.

11. The apparatus of claim 1, wherein the one or more processors are configured to cause the wireless communication device to:
receive, from a network entity, the control information via the second channel, wherein the control information comprises one or more commands for the digital interface; and
configure the digital interface based at least in part on the one or more commands.

12. The apparatus of claim 11, wherein, to configure the digital interface, the one or more processors are configured to cause the wireless communication device to:
power on the digital interface, power off the digital interface, configure a monitoring periodicity of the digital interface, configure one or more resources to be monitored by the digital interface, or any combination thereof, based at least in part on the one or more commands.

13. The apparatus of claim 1, wherein the one or more processors are configured to cause the wireless communication device to:
receive out of band control information via the second channel; and
perform an amplification and forward operation in the first channel for an analog radio frequency signal based at least in part on the out of band control information.

14. The apparatus of claim 13, wherein the out of band control information indicates a receive beam direction for the analog radio frequency signal, a receive time interval for the analog radio frequency signal, a transmit beam direction for the analog radio frequency signal, a transmit time interval for the analog radio frequency signal, or any combination thereof.

15. The apparatus of claim 1, wherein the apparatus comprises a wireless repeater.

16. An apparatus for wireless communication at a network entity comprising:
one or more memories; and
one or more processors coupled with the one or more memories and configured to cause the network entity to:
receive, from a wireless device in a second channel operating in a radio frequency band different from a first channel, an indication of a monitoring state of a digital interface of the wireless device; and
send, for the wireless device in the second channel, control information based at least in part on the indication of the monitoring state of the digital interface of the wireless device, wherein the control information indicates a receive beam direction for an analog radio frequency signal in the first channel, a receive time interval for the analog radio frequency signal, a transmit beam direction for the analog radio frequency signal, a transmit time interval for the analog radio frequency signal, or any combination thereof.

17. The apparatus of claim 16, wherein the monitoring state of the digital interface of the wireless device is based at least in part on whether the digital interface of the wireless device is powered on.

18. The apparatus of claim 16, wherein the monitoring state of the digital interface of the wireless device is based at least in part on a monitoring periodicity of the digital interface of the wireless device.

19. The apparatus of claim 16, wherein the one or more processors are configured to cause the network entity to:
send, for the wireless device, configuration information indicative of one or more configured slots, one or more beamforming parameters, an uplink or downlink direction, a threshold, or any combination thereof, for wireless repeater measurement of an energy level in the first channel.

20. The apparatus of claim 19, wherein the configuration information indicative of the threshold comprises an absolute value of the energy level or a relative value of the energy level compared to energy detected in one or more resources other than the one or more configured slots.

21. The apparatus of claim 16, wherein the first channel comprises a millimeter wave channel and the second channel comprises a sub-6 gigahertz channel.

22. The apparatus of claim 16, wherein the control information comprises one or more commands for the digital interface of the wireless device.

23. The apparatus of claim 22, wherein the one or more commands are indicative of whether the digital interface of the wireless device is powered on, whether the digital interface of the wireless device is powered off, a monitoring periodicity of the digital interface of the wireless device, one or more resources to be monitored by the digital interface of the wireless device, or any combination thereof.

24. The apparatus of claim 16, further comprising:
a transceiver coupled with the one or more processors, wherein the one or more processors are configured to cause the network entity to:
receive an amplified and forwarded analog radio frequency signal of the analog radio frequency signal from the wireless device based at least in part on the control information.

25. The apparatus of claim 16, wherein the apparatus comprises the network entity.

26. A method for wireless communication at a wireless device, comprising:
measuring an energy level, using an analog interface, in a first channel during one or more configured slots;
powering on a digital interface based at least in part on the measured energy level satisfying a threshold; and
monitoring a second channel, using the digital interface, for control information.

27. The method of claim 26, further comprising:
measuring the energy level in a millimeter wave channel during one or more random access channel slots.

28. The method of claim 26, further comprising:
receiving, from a network entity, signaling that indicates the threshold.

29. A method of wireless communication at a network entity, comprising:
receiving, from a wireless device in a second channel operating in a radio frequency band different from a first channel, an indication of a monitoring state of a digital interface of the wireless device; and
sending, for the wireless device in the second channel, control information based at least in part on the indication of the monitoring state of the digital interface of the wireless device, wherein the control information indicates a receive beam direction for an analog radio frequency signal in the first channel, a receive time interval for the analog radio frequency signal, a transmit beam direction for the analog radio frequency signal, a transmit time interval for the analog radio frequency signal, or any combination thereof.

30. The method of claim 29, further comprising:
sending, for the wireless device, configuration information indicative of one or more configured slots, one or more beamforming parameters, an uplink or downlink direction, a threshold, or any combination thereof, for wireless repeater measurement of an energy level in the first channel.

31. The method of claim 26, further comprising:
receiving, from a network entity, configuration information indicative of the one or more configured slots, one or more beamforming parameters, an uplink or downlink direction associated with the energy level, the threshold, or any combination thereof.

32. The method of claim 26, further comprising:
setting a digital interface timer based at least in part on the measured energy level satisfying the threshold.

33. The method of claim 32, further comprising:
powering off the digital interface based at least in part on expiration of the digital interface timer.

34. The method of claim 32, further comprising:
receiving, from a network entity, the control information via the second channel prior to expiration of the digital interface timer, wherein the control information comprises one or more commands for the digital interface; and
configuring the digital interface based at least in part on the one or more commands.

35. The method of claim 29, wherein the monitoring state of the digital interface of the wireless device is based at least in part on whether the digital interface of the wireless device is powered on.

36. The method of claim 29, wherein the monitoring state of the digital interface of the wireless device is based at least in part on a monitoring periodicity of the digital interface of the wireless device.

37. The method of claim 29, further comprising:
sending, for the wireless device, configuration information indicative of one or more configured slots, one or more beamforming parameters, an uplink or downlink direction, a threshold, or any combination thereof, for wireless repeater measurement of an energy level in the first channel.

38. The method of claim 29, wherein the first channel comprises a millimeter wave channel and the second channel comprises a sub-6 gigahertz channel.

39. A non-transitory computer-readable medium storing code for wireless communications, the code comprising instructions executable by one or more processors to:
measure an energy level, using an analog interface, in a first channel during one or more configured slots;
power on a digital interface based at least in part on the measured energy level satisfying a threshold; and
monitor a second channel, using the digital interface, for control information.

40. The non-transitory computer-readable medium of claim 39, wherein the instructions to measure the energy level are executable, the one or more processors to:
measure the energy level in a millimeter wave channel during one or more random access channel slots.

41. The non-transitory computer-readable medium of claim 39, wherein the instructions are further executable by the one or more processors to:
receive, from a network entity, signaling that indicates the threshold.

42. The non-transitory computer-readable medium of claim 39, wherein the instructions are further executable by the one or more processors to:
receive, from a network entity, configuration information indicative of the one or more configured slots, one or more beamforming parameters, an uplink or downlink direction associated with the energy level, the threshold, or any combination thereof.

43. The non-transitory computer-readable medium of claim 39, wherein the instructions are further executable by the one or more processors to:
set a digital interface timer based at least in part on the measured energy level satisfying the threshold.

44. The non-transitory computer-readable medium of claim 43, wherein the instructions are further executable by the one or more processors to:
power off the digital interface based at least in part on expiration of the digital interface timer.

45. The non-transitory computer-readable medium of claim 43, wherein the instructions are further executable by the one or more processors to:
receive, from a network entity, the control information via the second channel prior to expiration of the digital interface timer, wherein the control information comprises one or more commands for the digital interface; and
configure the digital interface based at least in part on the one or more commands.

46. A non-transitory computer-readable medium storing code for wireless communications, the code comprising instructions executable by one or more processors to:
receive, from a wireless device in a second channel operating in a radio frequency band different from a first channel, an indication of a monitoring state of a digital interface of the wireless device; and
send, for the wireless device in the second channel, control information based at least in part on the indication of the monitoring state of the digital interface of the wireless device, wherein the control information indicates a receive beam direction for an analog radio frequency signal in the first channel, a receive time interval for the analog radio frequency signal, a transmit beam direction for the analog radio frequency signal, a transmit time interval for the analog radio frequency signal, or any combination thereof.

47. The non-transitory computer-readable medium of claim 46, wherein the monitoring state of the digital interface of the wireless device is based at least in part on whether the digital interface of the wireless device is powered on.

48. The non-transitory computer-readable medium of claim 46, wherein the monitoring state of the digital interface of the wireless device is based at least in part on a monitoring periodicity of the digital interface of the wireless device.

49. The non-transitory computer-readable medium of claim 46, wherein the instructions are further executable by the one or more processors to:
send, for the wireless device, configuration information indicative of one or more configured slots, one or more beamforming parameters, an uplink or downlink direction, a threshold, or any combination thereof, for wireless repeater measurement of an energy level in the first channel.

50. The non-transitory computer-readable medium of claim 46, wherein the first channel comprises a millimeter wave channel and the second channel comprises a sub-6 gigahertz channel.

51. An apparatus for wireless communication at a network entity, comprising:
one or more memories; and
one or more processors coupled with the one or more memories, the one or more processors configured to cause the network entity to:
send, for a wireless device, configuration information for wireless repeater measurement of an energy level in a first channel; and
send, for the wireless device in a second channel different from the first channel, control information based at least in part on sending of the configuration information, wherein the control information indicates a configuration for forwarding an analog radio frequency signal in a third channel.

52. The apparatus of claim 51, wherein the configuration information is indicative of one or more configured slots, one or more beamforming parameters, an uplink or downlink direction, a threshold, or any combination thereof.

53. The apparatus of claim 52, wherein the configuration information indicative of the threshold comprises an absolute value of the energy level or a relative value of the energy level compared to energy detected in one or more resources other than the one or more configured slots.

54. The apparatus of claim 51, wherein the configuration indicates a receive beam direction for the analog radio frequency signal in the first channel, a receive time interval for the analog radio frequency signal, a transmit beam direction for the analog radio frequency signal, a transmit time interval for the analog radio frequency signal, or any combination thereof.

55. The apparatus of claim 51, wherein the first channel comprises a first millimeter wave channel, the third channel comprises a second millimeter wave channel, and the second channel comprises a sub-6 gigahertz channel.

56. The apparatus of claim 51, further comprising:
a transceiver coupled with the one or more processors, wherein the one or more processors are configured to cause the network entity to:
receive the analog radio frequency signal in the third channel forwarded from the wireless device based at least in part on the control information.

57. The apparatus of claim 51, wherein the wireless device comprises a wireless repeater.

58. A method of wireless communication at a network entity, comprising:
sending, for a wireless device, configuration information for wireless repeater measurement of an energy level in a first channel; and
sending, for the wireless device in a second channel different from the first channel, control information based at least in part on sending of the configuration information, wherein the control information indicates a configuration for forwarding an analog radio frequency signal in a third channel.

59. The method of claim 58, wherein the configuration information is indicative of one or more configured slots, one or more beamforming parameters, an uplink or downlink direction, a threshold, or any combination thereof.

60. The method of claim 59, wherein the configuration information indicative of the threshold comprises an absolute value of the energy level or a relative value of the energy level compared to energy detected in one or more resources other than the one or more configured slots.

61. The method of claim 58, wherein the configuration indicates a receive beam direction for the analog radio frequency signal in the first channel, a receive time interval for the analog radio frequency signal, a transmit beam direction for the analog radio frequency signal, a transmit time interval for the analog radio frequency signal, or any combination thereof.

62. The method of claim 58, wherein the first channel comprises a first millimeter wave channel, the third channel comprises a second millimeter wave channel, and the second channel comprises a sub 6 gigahertz channel.

63. The method of claim 58, further comprising:
receiving the analog radio frequency signal in the third channel forwarded from the wireless device based at least in part on the control information.

64. A non-transitory computer-readable medium storing code for wireless communications, the code comprising instructions executable by one or more processors to:
send, for a wireless device, configuration information for wireless repeater measurement of an energy level in a first channel; and
send, for the wireless device in a second channel different from the first channel, control information based at least in part on sending of the configuration information, wherein the control information indicates a configuration for forwarding an analog radio frequency signal in a third channel.

65. The non-transitory computer-readable medium of claim 64, wherein the configuration information is indicative of one or more configured slots, one or more beamforming parameters, an uplink or downlink direction, a threshold, or any combination thereof.

66. The non-transitory computer-readable medium of claim 65, wherein the configuration information indicative of the threshold comprises an absolute value of the energy level or a relative value of the energy level compared to energy detected in one or more resources other than the one or more configured slots.

67. The non-transitory computer-readable medium of claim 64, wherein the configuration indicates a receive beam direction for the analog radio frequency signal in the first channel, a receive time interval for the analog radio frequency signal, a transmit beam direction for the analog radio frequency signal, a transmit time interval for the analog radio frequency signal, or any combination thereof.

68. The non-transitory computer-readable medium of claim 64, wherein the first channel comprises a first millimeter wave channel, the third channel comprises a second millimeter wave channel, and the second channel comprises a sub-6 gigahertz channel.

69. The non-transitory computer-readable medium of claim 64, wherein the instructions are further executable by the one or more processors to:
receive the analog radio frequency signal in the third channel forwarded from the wireless device based at least in part on the control information.

70. An apparatus for wireless communication at a wireless communication device, comprising:
one or more memories; and
one or more processors coupled with the one or more memories, the one or more processors configured to cause the wireless communication device to:
receive, from a network entity, configuration information for wireless repeater measurement of an energy level in a first channel; and
receive, from the network entity in a second channel different from the first channel, control information based at least in part on reception of the configuration information, wherein the control information indicates a configuration for forwarding an analog radio frequency signal in a third channel.

71. The apparatus of claim 70, wherein the configuration information is indicative of one or more configured slots, one or more beamforming parameters, an uplink or downlink direction, a threshold, or any combination thereof.

72. The apparatus of claim 71, wherein the configuration information is indicative of the threshold comprises an absolute value of the energy level or a relative value of the energy level compared to energy detected in one or more resources other than the one or more configured slots.

73. The apparatus of claim 70, wherein the configuration indicates a receive beam direction for the analog radio frequency signal in the first channel, a receive time interval for the analog radio frequency signal, a transmit beam direction for the analog radio frequency signal, a transmit time interval for the analog radio frequency signal, or any combination thereof.

74. The apparatus of claim 70, wherein the first channel comprises a first millimeter wave channel, the third channel comprises a second millimeter wave channel, and the second channel comprises a sub-6 gigahertz channel.

75. The apparatus of claim 70, further comprising:
a transceiver coupled with the one or more processors, wherein the one or more processors are configured to cause the wireless communication device to:
forward the analog radio frequency signal in the third channel to the network entity based at least in part on the control information.

76. The apparatus of claim 70, wherein the wireless communication device comprises a wireless repeater.

77. A method of wireless communication at a wireless communication device, comprising:
receiving, from a network entity, configuration information for wireless repeater measurement of an energy level in a first channel; and receiving, from the network entity in a second channel different from the first channel, control information based at least in part on reception of the configuration information, wherein the control information indicates a configuration for forwarding an analog radio frequency signal in a third channel.

78. The method of claim 77, wherein the configuration information is indicative of one or more configured slots, one or more beamforming parameters, an uplink or downlink direction, a threshold, or any combination thereof.

79. The method of claim 78, wherein the configuration information indicative of the threshold comprises an absolute value of the energy level or a relative value of the energy level compared to energy detected in one or more resources other than the one or more configured slots.

80. The method of claim 77, wherein the configuration indicates a receive beam direction for the analog radio frequency signal in the first channel, a receive time interval for the analog radio frequency signal, a transmit beam direction for the analog radio frequency signal, a transmit time interval for the analog radio frequency signal, or any combination thereof.

81. The method of claim 77, wherein the first channel comprises a first millimeter wave channel, the third channel comprises a second millimeter wave channel, and the second channel comprises a sub 6 gigahertz channel.

82. The method of claim 77, further comprising:
forwarding the analog radio frequency signal in the third channel to the network entity based at least in part on the control information.

83. A non-transitory computer-readable medium storing code for wireless communications, the code comprising instructions executable by one or more processors to:
receive, from a network entity, configuration information for wireless repeater measurement of an energy level in a first channel; and receive, from the network entity in a second channel different from the first channel, control information based at least in part on reception of the configuration information, wherein the control information indicates a configuration for forwarding an analog radio frequency signal in a third channel.

84. The non-transitory computer-readable medium of claim 83, wherein the configuration information is indicative of one or more configured slots, one or more beamforming parameters, an uplink or downlink direction, a threshold, or any combination thereof.

85. The non-transitory computer-readable medium of claim 84, wherein the configuration information indicative of the threshold comprises an absolute value of the energy level or a relative value of the energy level compared to energy detected in one or more resources other than the one or more configured slots.

86. The non-transitory computer-readable medium of claim 83, wherein the configuration indicates a receive beam direction for the analog radio frequency signal in the first channel, a receive time interval for the analog radio frequency signal, a transmit beam direction for the analog radio frequency signal, a transmit time interval for the analog radio frequency signal, or any combination thereof.

87. The non-transitory computer-readable medium of claim 83, wherein the first channel comprises a first millimeter wave channel, the third channel comprises a second millimeter wave channel, and the second channel comprises a sub-6 gigahertz channel.

88. The non-transitory computer-readable medium of claim 83, wherein the instructions are further executable by the one or more processors to:
forward the analog radio frequency signal in the third channel to the network entity based at least in part on the control information.

* * * * *